(12) United States Patent
Danilov et al.

(10) Patent No.: US 11,435,957 B2
(45) Date of Patent: Sep. 6, 2022

(54) SELECTIVE INSTANTIATION OF A STORAGE SERVICE FOR A DOUBLY MAPPED REDUNDANT ARRAY OF INDEPENDENT NODES

(71) Applicant: EMC IP Holding Company LLC, Hopkinton, MA (US)

(72) Inventors: Mikhail Danilov, Saint Petersburg (RU); Yohannes Altaye, Dumfries, VA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 0 days.

(21) Appl. No.: 16/698,096

(22) Filed: Nov. 27, 2019

(65) Prior Publication Data
US 2021/0157530 A1    May 27, 2021

(51) Int. Cl.
*G06F 3/06* (2006.01)
*G06F 12/10* (2016.01)

(52) U.S. Cl.
CPC ............ *G06F 3/0664* (2013.01); *G06F 3/061* (2013.01); *G06F 3/0644* (2013.01); *G06F 3/0689* (2013.01); *G06F 12/10* (2013.01); G06F 2212/657 (2013.01)

(58) Field of Classification Search
None
See application file for complete search history.

(56) References Cited

U.S. PATENT DOCUMENTS

| | | | |
|---|---|---|---|
| 5,675,802 A | 10/1997 | Allen et al. | |
| 5,805,788 A | 9/1998 | Johnson | |
| 5,950,225 A | 9/1999 | Kleiman | |
| 6,073,218 A | 6/2000 | Dekoning et al. | |
| 6,108,684 A | 8/2000 | Dekoning et al. | |
| 6,233,696 B1 | 5/2001 | Kedem | |
| 6,240,527 B1 | 5/2001 | Schneider et al. | |
| 6,502,243 B1 | 12/2002 | Thomas | |
| 6,549,921 B1 | 4/2003 | Ofek | |
| 7,007,044 B1 | 2/2006 | Rafert et al. | |
| 7,103,884 B2 | 9/2006 | Fellin et al. | |
| 7,389,393 B1 | 6/2008 | Karr et al. | |
| 7,577,091 B2 | 8/2009 | Antal et al. | |

(Continued)

OTHER PUBLICATIONS

Final Office Action received for U.S. Appl. No. 16/010,255 dated Jul. 23, 2020, 36 pages.

(Continued)

*Primary Examiner* — Brian R Peugh
(74) *Attorney, Agent, or Firm* — Amin, Turocy & Watson, LLP

(57) ABSTRACT

Selective instantiation of a mapped cluster storage service (MCSS) is disclosed for storage system supporting a doubly mapped redundant array of independent nodes environment. An instance of a MCSS can be run on computing resources of the storage system supporting a doubly mapped redundant array of independent nodes environment, wherein a real node of a real cluster comprises a real storage device that comprises real extents, and wherein extents of the storage system map to a mapped node of a mapped cluster. The instance of the MCSS can be run near to the highest number of real extents participating in a mapped node. This can reduce computing resource consumption associated with running the MCSS farther from the more concentrated real extents.

20 Claims, 10 Drawing Sheets

(56) References Cited

U.S. PATENT DOCUMENTS

| | | | |
|---|---|---|---|
| 7,631,051 B1 | 12/2009 | Fein et al. |
| 7,636,814 B1 | 12/2009 | Karr et al. |
| 7,664,839 B1 | 2/2010 | Karr et al. |
| 7,680,875 B1 | 3/2010 | Shopiro et al. |
| 7,694,191 B1 | 4/2010 | Bono et al. |
| 7,721,044 B1 | 5/2010 | Chatterjee et al. |
| 7,653,792 B2 | 6/2010 | Shimada et al. |
| 7,752,403 B1 | 7/2010 | Weinman, Jr. |
| 7,895,394 B2 | 2/2011 | Nakajima et al. |
| 8,125,406 B1 | 2/2012 | Jensen et al. |
| 8,261,033 B1 | 9/2012 | Slik et al. |
| 8,370,542 B2 | 2/2013 | Lu et al. |
| 8,429,514 B1 | 4/2013 | Goel |
| 8,479,037 B1 | 7/2013 | Chatterjee et al. |
| 8,495,465 B1 | 7/2013 | Anholt et al. |
| 8,504,518 B1 | 8/2013 | Ghemawat et al. |
| 8,540,625 B2 | 9/2013 | Miyoshi |
| 8,683,205 B2 | 3/2014 | Resch et al. |
| 8,725,986 B1 | 5/2014 | Goel |
| 8,751,599 B2 | 6/2014 | Tran et al. |
| 8,751,740 B1 | 6/2014 | De Forest et al. |
| 8,751,897 B2 | 6/2014 | Borthakur et al. |
| 8,799,746 B2 | 8/2014 | Baker et al. |
| 8,832,234 B1 | 9/2014 | Brooker et al. |
| 8,856,619 B1 | 10/2014 | Cypher |
| 8,856,624 B1 | 10/2014 | Paniconi |
| 8,892,938 B1 | 11/2014 | Sundaram et al. |
| 8,972,478 B1 | 3/2015 | Storer et al. |
| 9,003,086 B1 | 4/2015 | Schuller et al. |
| 9,021,296 B1 | 4/2015 | Kiselev et al. |
| 9,037,825 B1 | 5/2015 | Donlan et al. |
| 9,052,942 B1 | 6/2015 | Barber et al. |
| 9,063,838 B1 | 6/2015 | Boyle et al. |
| 9,098,447 B1 | 8/2015 | Donlan et al. |
| 9,128,910 B1 | 9/2015 | Dayal et al. |
| 9,208,009 B2 | 12/2015 | Resch et al. |
| 9,218,135 B2 | 12/2015 | Miller et al. |
| 9,244,761 B2 | 1/2016 | Yekhanin et al. |
| 9,268,783 B1 | 2/2016 | Shilane et al. |
| 9,274,903 B1 | 3/2016 | Garlapati et al. |
| 9,280,430 B2 | 3/2016 | Sarfare et al. |
| 9,405,483 B1 | 8/2016 | Wei et al. |
| 9,411,717 B2 | 8/2016 | Goss et al. |
| 9,442,802 B2 | 9/2016 | Hung |
| 9,477,682 B1 | 10/2016 | Bent et al. |
| 9,495,241 B2 | 11/2016 | Flynn et al. |
| 9,619,256 B1 | 4/2017 | Natanzon et al. |
| 9,641,615 B1 | 5/2017 | Robins et al. |
| 9,665,428 B2 | 5/2017 | Vairavanathan et al. |
| 9,747,057 B1 | 8/2017 | Ramani et al. |
| 9,817,713 B2 | 11/2017 | Gupta et al. |
| 9,864,527 B1 | 1/2018 | Srivastav et al. |
| 9,942,084 B1 | 4/2018 | Sorenson, III |
| 9,971,649 B2 | 5/2018 | Dhuse et al. |
| 10,001,947 B1 | 6/2018 | Chatterjee et al. |
| 10,007,561 B1 | 6/2018 | Pudipeddi et al. |
| 10,055,145 B1 | 8/2018 | Danilov et al. |
| 10,061,668 B1 | 8/2018 | Lazier et al. |
| 10,089,026 B1 | 10/2018 | Puhov et al. |
| 10,097,659 B1 | 10/2018 | Rao |
| 10,108,819 B1 | 10/2018 | Donlan et al. |
| 10,127,234 B1 | 11/2018 | Krishnan et al. |
| 10,216,770 B1 | 2/2019 | Kulesza et al. |
| 10,242,022 B1 | 3/2019 | Jain et al. |
| 10,282,262 B2 | 5/2019 | Panara et al. |
| 10,289,488 B1 | 5/2019 | Danilov et al. |
| 10,331,516 B2 | 6/2019 | Danilov et al. |
| 10,361,810 B2 | 7/2019 | Myung et al. |
| 10,387,546 B1 | 8/2019 | Duran et al. |
| 10,496,330 B1 | 12/2019 | Bernat et al. |
| 10,503,611 B1 | 12/2019 | Srivastav et al. |
| 10,567,009 B2 | 2/2020 | Yang et al. |
| 10,579,490 B2 | 3/2020 | Danilov et al. |
| 10,613,780 B1 | 4/2020 | Naeni et al. |
| 10,628,043 B1 | 4/2020 | Chatterjee et al. |
| 10,644,408 B2 | 5/2020 | Sakai et al. |
| 10,671,431 B1 | 6/2020 | Dolan et al. |
| 10,705,911 B2 | 7/2020 | Vishnumolakala et al. |
| 10,733,053 B1 | 8/2020 | Miller et al. |
| 10,740,183 B1 | 8/2020 | Blaum et al. |
| 10,754,845 B2 | 8/2020 | Danilov et al. |
| 10,761,931 B2 | 9/2020 | Goyal et al. |
| 10,797,863 B2 | 10/2020 | Chen et al. |
| 10,846,003 B2 | 11/2020 | Danilov et al. |
| 10,951,236 B2 | 3/2021 | Chen et al. |
| 11,023,331 B2 | 6/2021 | Danilov et al. |
| 2002/0049883 A1 | 4/2002 | Schneider et al. |
| 2002/0166026 A1 | 11/2002 | Ulrich et al. |
| 2002/0191311 A1 | 12/2002 | Ulrich et al. |
| 2003/0016596 A1 | 1/2003 | Chiquoine et al. |
| 2005/0027938 A1 | 2/2005 | Burkey |
| 2005/0071546 A1 | 3/2005 | Delaney et al. |
| 2005/0080982 A1 | 4/2005 | Vasilevsky et al. |
| 2005/0088318 A1 | 4/2005 | Liu et al. |
| 2005/0108775 A1 | 5/2005 | Bachar et al. |
| 2005/0140529 A1 | 6/2005 | Choi et al. |
| 2005/0234941 A1 | 10/2005 | Watanabe |
| 2006/0047896 A1 | 3/2006 | Nguyen et al. |
| 2006/0075007 A1 | 4/2006 | Anderson et al. |
| 2006/0143508 A1 | 6/2006 | Mochizuki et al. |
| 2006/0212744 A1 | 9/2006 | Benner et al. |
| 2006/0265211 A1 | 11/2006 | Canniff et al. |
| 2007/0076321 A1 | 4/2007 | Takahashi et al. |
| 2007/0239759 A1 | 10/2007 | Shen et al. |
| 2007/0250674 A1 | 10/2007 | Findberg et al. |
| 2008/0222480 A1 | 9/2008 | Huang et al. |
| 2008/0222481 A1 | 9/2008 | Huang et al. |
| 2008/0244353 A1 | 10/2008 | Dholakia et al. |
| 2008/0320061 A1 | 12/2008 | Aszmann et al. |
| 2009/0070771 A1 | 3/2009 | Yuyitung et al. |
| 2009/0113034 A1 | 4/2009 | Krishnappa et al. |
| 2009/0132543 A1 | 5/2009 | Chatley et al. |
| 2009/0172464 A1 | 7/2009 | Byrne et al. |
| 2009/0183056 A1 | 7/2009 | Aston |
| 2009/0204959 A1 | 8/2009 | Anand et al. |
| 2009/0240880 A1 | 9/2009 | Kawaguchi |
| 2009/0259882 A1 | 10/2009 | Shellhamer |
| 2010/0031060 A1 | 2/2010 | Chew et al. |
| 2010/0094963 A1 | 4/2010 | Zuckerman et al. |
| 2010/0174968 A1 | 7/2010 | Charles et al. |
| 2010/0218037 A1 | 8/2010 | Swartz et al. |
| 2010/0293348 A1 | 11/2010 | Ye et al. |
| 2010/0332748 A1 | 12/2010 | Van der Goot et al. |
| 2011/0029836 A1 | 2/2011 | Dhuse et al. |
| 2011/0040937 A1 | 2/2011 | Augenstein et al. |
| 2011/0066882 A1 | 3/2011 | Walls et al. |
| 2011/0106972 A1 | 5/2011 | Grube et al. |
| 2011/0107165 A1 | 5/2011 | Resch et al. |
| 2011/0138148 A1 | 6/2011 | Friedman et al. |
| 2011/0161712 A1 | 6/2011 | Athalye et al. |
| 2011/0191536 A1 | 8/2011 | Mizuno et al. |
| 2011/0196833 A1 | 8/2011 | Drobychev et al. |
| 2011/0246503 A1 | 10/2011 | Bender et al. |
| 2011/0292054 A1 | 12/2011 | Boker et al. |
| 2012/0023291 A1 | 1/2012 | Zeng et al. |
| 2012/0096214 A1 | 4/2012 | Lu et al. |
| 2012/0191675 A1 | 7/2012 | Kim et al. |
| 2012/0191901 A1 | 7/2012 | Norair |
| 2012/0204077 A1 | 8/2012 | D'Abreu et al. |
| 2012/0233117 A1 | 9/2012 | Holt et al. |
| 2012/0311395 A1 | 12/2012 | Leggette et al. |
| 2012/0317234 A1 | 12/2012 | Bohrer et al. |
| 2012/0321052 A1 | 12/2012 | Morrill et al. |
| 2013/0013564 A1 | 1/2013 | Ben-Or et al. |
| 2013/0047187 A1 | 2/2013 | Frazier et al. |
| 2013/0054822 A1 | 2/2013 | Mordani et al. |
| 2013/0067159 A1 | 3/2013 | Mehra |
| 2013/0067187 A1 | 3/2013 | Moss et al. |
| 2013/0088501 A1 | 4/2013 | Fell |
| 2013/0097470 A1 | 4/2013 | Hwang et al. |
| 2013/0145208 A1 | 6/2013 | Yen et al. |
| 2013/0238932 A1 | 9/2013 | Resch |
| 2013/0246876 A1 | 9/2013 | Manssour et al. |
| 2013/0290482 A1 | 10/2013 | Leggette |

(56) References Cited

U.S. PATENT DOCUMENTS

| | | |
|---|---|---|
| 2013/0305365 A1 | 11/2013 | Rubin et al. |
| 2014/0040417 A1 | 2/2014 | Galdwin et al. |
| 2014/0064048 A1 | 3/2014 | Cohen et al. |
| 2014/0115182 A1 | 4/2014 | Sabaa et al. |
| 2014/0122745 A1 | 5/2014 | Singh et al. |
| 2014/0149794 A1 | 5/2014 | Shetty et al. |
| 2014/0164430 A1 | 6/2014 | Hadjieleftheriou et al. |
| 2014/0164694 A1 | 6/2014 | Storer |
| 2014/0172930 A1 | 6/2014 | Molaro et al. |
| 2014/0250450 A1 | 9/2014 | Yu et al. |
| 2014/0280375 A1 | 9/2014 | Rawson et al. |
| 2014/0281804 A1 | 9/2014 | Resch |
| 2014/0297955 A1 | 10/2014 | Yamazaki et al. |
| 2014/0304460 A1 | 10/2014 | Carlson, Jr. et al. |
| 2014/0331100 A1 | 11/2014 | Dhuse et al. |
| 2014/0351633 A1 | 11/2014 | Grube et al. |
| 2014/0358972 A1 | 12/2014 | Guarrieri et al. |
| 2014/0359244 A1 | 12/2014 | Chambliss et al. |
| 2014/0380088 A1 | 12/2014 | Bennett et al. |
| 2014/0380125 A1 | 12/2014 | Calder et al. |
| 2014/0380126 A1 | 12/2014 | Yekhanin et al. |
| 2015/0006846 A1 | 1/2015 | Youngworth |
| 2015/0074065 A1 | 3/2015 | Christ et al. |
| 2015/0112951 A1 | 4/2015 | Narayanamurthy et al. |
| 2015/0134626 A1 | 5/2015 | Theimer et al. |
| 2015/0142863 A1 | 5/2015 | Yuen et al. |
| 2015/0160872 A1 | 6/2015 | Chen |
| 2015/0178007 A1 | 6/2015 | Moisa et al. |
| 2015/0186043 A1 | 7/2015 | Kesselman et al. |
| 2015/0254150 A1 | 9/2015 | Gordon et al. |
| 2015/0269025 A1 | 9/2015 | Krishnamurthy et al. |
| 2015/0303949 A1 | 10/2015 | Jafarkhani et al. |
| 2015/0331766 A1 | 11/2015 | Sarfare et al. |
| 2015/0370656 A1 | 12/2015 | Tsafrir et al. |
| 2015/0378542 A1 | 12/2015 | Saito et al. |
| 2016/0011935 A1 | 1/2016 | Luby |
| 2016/0011936 A1 | 1/2016 | Luby |
| 2016/0055054 A1 | 2/2016 | Patterson, III et al. |
| 2016/0085645 A1 | 3/2016 | Buzzard et al. |
| 2016/0162378 A1 | 6/2016 | Garlapati et al. |
| 2016/0169692 A1 | 6/2016 | Gupta |
| 2016/0170668 A1 | 6/2016 | Mehra |
| 2016/0217104 A1 | 7/2016 | Kamble et al. |
| 2016/0232055 A1 | 8/2016 | Vairavanathan et al. |
| 2016/0239384 A1 | 8/2016 | Slik |
| 2016/0253400 A1 | 9/2016 | McAlister et al. |
| 2016/0277497 A1 | 9/2016 | Bannister et al. |
| 2016/0292429 A1 | 9/2016 | Bannister et al. |
| 2016/0294419 A1 | 10/2016 | Sandell et al. |
| 2016/0328295 A1 | 11/2016 | Baptist et al. |
| 2016/0357443 A1 | 12/2016 | Li et al. |
| 2016/0357649 A1 | 12/2016 | Karrotu et al. |
| 2016/0371145 A1 | 12/2016 | Akutsu et al. |
| 2016/0378624 A1 | 12/2016 | Jenkins, Jr. et al. |
| 2016/0380650 A1 | 12/2016 | Calder et al. |
| 2017/0003880 A1 | 1/2017 | Fisher et al. |
| 2017/0004044 A1 | 1/2017 | Tormasov et al. |
| 2017/0010944 A1 | 1/2017 | Saito et al. |
| 2017/0017671 A1 | 1/2017 | Baptist et al. |
| 2017/0031945 A1 | 2/2017 | Sarab et al. |
| 2017/0097875 A1 | 4/2017 | Jess et al. |
| 2017/0102993 A1 | 4/2017 | Hu et al. |
| 2017/0115903 A1 | 4/2017 | Franke et al. |
| 2017/0116088 A1 | 4/2017 | Anami et al. |
| 2017/0123914 A1 | 5/2017 | Li et al. |
| 2017/0153946 A1 | 6/2017 | Baptist et al. |
| 2017/0185331 A1 | 6/2017 | Gao et al. |
| 2017/0187398 A1 | 6/2017 | Trusov |
| 2017/0187766 A1 | 6/2017 | Zheng et al. |
| 2017/0206025 A1 | 7/2017 | Viswanathan |
| 2017/0206135 A1 | 7/2017 | Zeng |
| 2017/0212680 A1 | 7/2017 | Waghulde |
| 2017/0212845 A1 | 7/2017 | Conway |
| 2017/0220662 A1 | 8/2017 | Barton et al. |
| 2017/0235507 A1 | 8/2017 | Sinha et al. |
| 2017/0262187 A1 | 9/2017 | Manzanares et al. |
| 2017/0268900 A1 | 9/2017 | Nicolaas et al. |
| 2017/0272209 A1 | 9/2017 | Yanovsky et al. |
| 2017/0285952 A1 | 10/2017 | Danilov et al. |
| 2017/0286009 A1 | 10/2017 | Danilov et al. |
| 2017/0286436 A1 | 10/2017 | Neporada et al. |
| 2017/0286516 A1 | 10/2017 | Horowitz et al. |
| 2017/0288701 A1 | 10/2017 | Slik et al. |
| 2017/0344285 A1 | 11/2017 | Choi et al. |
| 2018/0052744 A1 | 2/2018 | Chen et al. |
| 2018/0063213 A1 | 3/2018 | Bevilacqua-Linn et al. |
| 2018/0074753 A1 | 3/2018 | Ober |
| 2018/0074881 A1 | 3/2018 | Burden |
| 2018/0088857 A1 | 3/2018 | Gao et al. |
| 2018/0107415 A1 | 4/2018 | Motwani et al. |
| 2018/0121286 A1 | 5/2018 | Sipos |
| 2018/0129417 A1 | 5/2018 | Sivasubramanian et al. |
| 2018/0129600 A1 | 5/2018 | Ishiyama et al. |
| 2018/0181324 A1 | 6/2018 | Danilov et al. |
| 2018/0181475 A1 | 6/2018 | Danilov et al. |
| 2018/0181612 A1 | 6/2018 | Danilov et al. |
| 2018/0217888 A1 | 8/2018 | Colgrove et al. |
| 2018/0246668 A1 | 8/2018 | Sakashita et al. |
| 2018/0267856 A1 | 9/2018 | Hayasaka et al. |
| 2018/0267985 A1 | 9/2018 | Badey et al. |
| 2018/0293017 A1 | 10/2018 | Curley et al. |
| 2018/0306600 A1 | 10/2018 | Nicolaas et al. |
| 2018/0307560 A1 | 10/2018 | Vishnumolakala et al. |
| 2018/0341662 A1 | 11/2018 | He |
| 2018/0375936 A1 | 12/2018 | Chirammal et al. |
| 2019/0028179 A1 | 1/2019 | Kalhan |
| 2019/0034084 A1 | 1/2019 | Nagarajan et al. |
| 2019/0043201 A1 | 2/2019 | Strong et al. |
| 2019/0043351 A1 | 2/2019 | Yang et al. |
| 2019/0050301 A1 | 2/2019 | Juniwal et al. |
| 2019/0065092 A1 | 2/2019 | Shah et al. |
| 2019/0065310 A1 | 2/2019 | Rozas |
| 2019/0102103 A1 | 4/2019 | Ari et al. |
| 2019/0114223 A1 | 4/2019 | Pydipaty et al. |
| 2019/0129644 A1 | 5/2019 | Gao et al. |
| 2019/0188079 A1 | 6/2019 | Kohli |
| 2019/0205437 A1 | 7/2019 | Larson et al. |
| 2019/0215017 A1 | 7/2019 | Danilov et al. |
| 2019/0220207 A1 | 7/2019 | Lingarajappa |
| 2019/0342418 A1 | 11/2019 | Eda et al. |
| 2019/0356416 A1 | 11/2019 | Yanovsky et al. |
| 2019/0384500 A1 | 12/2019 | Danilov et al. |
| 2019/0386683 A1 | 12/2019 | Danilov et al. |
| 2020/0004447 A1 | 1/2020 | Danilov et al. |
| 2020/0026810 A1 | 1/2020 | Subramaniam et al. |
| 2020/0034339 A1 | 1/2020 | Gershaneck et al. |
| 2020/0034471 A1 | 1/2020 | Danilov et al. |
| 2020/0042178 A1 | 2/2020 | Danilov et al. |
| 2020/0050510 A1 | 2/2020 | Chien et al. |
| 2020/0104377 A1 | 4/2020 | Earnesty, Jr. et al. |
| 2020/0117547 A1 | 4/2020 | Danilov et al. |
| 2020/0117556 A1 | 4/2020 | Zou et al. |
| 2020/0145511 A1 | 5/2020 | Gray et al. |
| 2020/0151353 A1 | 5/2020 | Struttmann |
| 2020/0204198 A1 | 6/2020 | Danilov et al. |
| 2021/0019067 A1 | 1/2021 | Miller et al. |
| 2021/0019093 A1 | 1/2021 | Karr et al. |
| 2021/0019237 A1 | 1/2021 | Karr et al. |
| 2021/0034268 A1 | 2/2021 | Hara et al. |
| 2021/0096754 A1 | 4/2021 | Danilov et al. |
| 2021/0132851 A1 | 5/2021 | Danilov et al. |
| 2021/0133049 A1 | 5/2021 | Danilov et al. |
| 2021/0218420 A1 | 7/2021 | Danilov et al. |
| 2021/0255791 A1 | 8/2021 | Shimada et al. |
| 2021/0273660 A1 | 9/2021 | Danilov et al. |

OTHER PUBLICATIONS

Office Action received for U.S. Appl. No. 16/010,246 dated Jul. 27, 2020 36 pages.

Office Action received for U.S. Appl. No. 16/177,278, dated Aug. 21, 2020, 53 pages.

(56) References Cited

OTHER PUBLICATIONS

Office Action received for U.S. Appl. No. 16/179,486, dated Aug. 13, 2020, 64 pages.
Guo et al., "GeoScale: Providing Geo-Elasticity in Distributed Clouds" 2016 IEEE International Conference on Cloud Engineering, 4 pages.
Guo et al., "Providing Geo-Elasticity in Geographically Distributed Clouds". ACM Transactions on Internet Technology, vol. 18, No. 3, Article 38. Apr. 2018. 27 pages.
Office Action received for U.S. Appl. No. 16/254,073, dated Aug. 18, 2020, 62 pages.
Non-Final Office Action received for U.S. Appl. No. 16/177,285 dated Jul. 22, 2020, 31 pages.
Non-Final Office Action received for U.S. Appl. No. 16/261,547 dated Sep. 3, 2020, 26 pages.
Non-Final Office Action received for U.S. Appl. No. 16/261,548 dated Aug. 21, 2020, 42 pages.
Notice of Allowance received for U.S. Appl. No. 16/261,549 dated Jul. 17, 2020, 40 pages.
Qiang et al., "Dynamics Process of Long-running Allocation/Collection in Linear Storage Space", International Conference on Networking, Architecture, and Storage (NAS 2007), Guilin, 2007, pp. 209-216.
Non-Final Office Action received for U.S. Appl. No. 16/374,725 dated Aug. 19, 2020, 50 pages.
Non-Final Office Action received for U.S. Appl. No. 16/511,161 dated Jul. 10, 2020, 24 pages.
Notice of Allowance received for U.S. Appl. No. 15/862,547 dated Mar. 29, 2019 27 pages.
Non-Final Office Action received for U.S. Appl. No. 15/792,714 dated Apr. 4, 2019, 20 pages.
Final Office Action received for U.S. Appl. No. 15/792,714 dated Sep. 12, 2019, 43 pages.
Wikipedia "Garbage Collection", URL: https://en.wikipedia.org/wiki/Garbage_collection_(computer science)#Availability (Year: 2017) retrieved using the WayBackMachine, Sep. 8, 2017, 8 pages.
Wikipedia "Erasure code", URL: https://web.archive.org/web/20170908171158/https://en.wikipedia.org/wiki/Erasure_code (Year: 2017), retrieved using the WayBackMachine, Sep. 8, 2017, 5 pages.
Wikipedia "Front and back ends" URL: https://en.wikipedia.org/wiki/Front_and_back_ends (Year:2019), Sep. 6, 2019, 4 pages.
Notice of Allowance received for U.S. Appl. No. 15/792,714 dated Nov. 8, 2019, 31 pages.
Non-Final Office Action received for U.S. Appl. No. 15/791,390 dated Sep. 20, 2019, 27 pages.
Final Office Action received for U.S. Appl. No. 15/791,390 dated Feb. 6, 2020, 29 pages.
Non-Final Office Action received for U.S. Appl. No. 15/791,390 dated Apr. 30, 2020, 48 pages.
Huang et al., "Scale-RS: An Efficient Scaling Scheme for RS-Coded Storage Clusters," in IEEE Transactions on Parallel and Distributed Systems, vol. 26, No. 6, pp. 1704-1717, Jun. 1, 2015.
Non-Final Office Action received for U.S. Appl. No. 16/457,615 dated Jul. 20, 2020, 34 pages.
Non-Final Office Action received for U.S. Appl. No. 15/651,504 dated Mar. 21, 2019, 10 pages.
Non-Final Office Action received for U.S. Appl. No. 15/662,273 dated Nov. 16, 2018, 19 pages.
Final Office Action received for U.S. Appl. No. 15/662,273 dated May 15, 2019, 33 pages.
Non-Final Office Action received for U.S. Appl. No. 15/965,479 dated Apr. 15, 2019, 21 pages.
Non-Final Office Action received for U.S. Appl. No. 15/794,950 dated Jul. 9, 2019, 29 pages.
Final Office Action received for U.S. Appl. No. 15/651,504 dated Sep. 18, 2019, 15 pages.
Non-Final Office Action received for U.S. Appl. No. 15/952,179 dated Sep. 10, 2019, 42 pages.
Wikipedia, "Standard Raid Levels—RAID 6", URL: https://en.wikipedia.org/wiki/Standard_RAID_levels#RAID_6, Oct. 18, 2019, 11 pages.
Non-Final Office Action received for U.S. Appl. No. 15/656,382 dated Nov. 1, 2019, 47 pages.
Final Office Action received for U.S. Appl. No. 15/952,179 dated Nov. 26, 2019, 53 pages.
Non Final Office Action received for U.S. Appl. No. 16/024,314 dated Nov. 25, 2019, 42 pages.
Non- Final Office Action received for U.S. Appl. No. 16/177,278 dated Dec. 2, 2019, 55 pages.
Non-Final Office Action received for U.S. Appl. No. 15/651,504 dated Dec. 31, 2019, 18 pages.
Non-Final Office Action received for U.S. Appl. No. 16/010,246 dated Dec. 5, 2019, 67 pages.
Stonebreaker et al. "Distributed RAID—A New Multiple Copy Algorithm.", IEEE ICDE, 1990, pp. 430-437.
Muralidhar et al. "f4: Facebook's Warm BLOB Storage System", USENIX. OSDI, Oct. 2014, pp. 383-398.
Final Office Action dated Feb. 12, 2020 for U.S. Appl. No. 16/024,314, 29 pages.
Non-Final Office Action received for U.S. Appl. No. 16/010,255 dated Jan. 9, 2020, 31 pages.
Office Action dated Feb. 5, 2020 for U.S. Appl. No. 16/261,551, 30 pages.
Non-Final Office Action received for U.S. Appl. No. 16/228,612 dated Feb. 27, 2020, 49 pages.
Final Office Action received for U.S. Appl. No. 16/010,246 dated Mar. 16, 2020, 33 pages.
Final Office Action received for U.S. Appl. No. 15/656,382 dated Apr. 6, 2020, 31 pages.
Non-Final Office Action received for U.S. Appl. No. 15/582,167 dated Sep. 7, 2018, 19 pages.
Non-Final Office Action received for U.S. Appl. No. 15/952,179 dated Apr. 20, 2020, 68 pages.
Notice of Allowance received for U.S. Appl. No. 16/240,193, dated May 4, 2020, 46 pages.
Final Office Action received for U.S. Appl. No. 16/177,278, dated May 11, 2020, 53 pages.
Non-Final Office Action received for U.S. Appl. No. 16/231,018 dated May 8, 2020, 78 pages.
Notice of Allowance dated May 11, 2020 for U.S. Appl. No. 16/240,193, 24 pages.
Non-Final Office Action received for U.S. Appl. No. 16/228,624 dated Jun. 24, 2020, 65 pages.
Non-Final Office Action received for U.S. Appl. No. 16/240,272 dated Jun. 29, 2020, 64 pages.
Non-Final Office Action received for U.S. Appl. No. 16/228,612 dated Jun. 29, 2020, 62 pages.
Non-Final Office Action received for U.S. Appl. No. 16/399,897 dated Feb. 19, 2021, 56 pages.
Non-Final Office Action received for U.S. Appl. No. 16/670,715 dated Mar. 31, 2021, 60 pages.
Final Office Action received for U.S. Appl. No. 16/177,278 dated Feb. 24, 2021, 109 pages.
EMC; "EMC ECS (Elastic Cloud Storage) Architectural Guide v2.x", URL : https://www.dell.com/community/s/vjauj58549/attachments/vjauj58549/solutions-ch/477/1/h14071-ecs-architectural-guide-wp.pdf,Jun. 2015, 21 pages.
Mohan et al., "Geo-aware erasure coding for high-performance erasure-coded storage clusters", Springer Link, URL: https://link.springer.com/article/10.1007/s 12243-017-0623-2, Jan. 18, 2018.
Final Office Action received for U.S. Appl. No. 16/179,486 dated Jan. 28, 2021, 55 pages.
Non-Final Office Action received for U.S. Appl. No. 16/670,746 dated Feb. 16, 2021, 55 pages.
Dell Technologies, "ECS Overview and Architecture", h14071.18, Feb. 2021, 55 Pages.
Non-Final Office Action received for U.S. Appl. No. 16/177,285 dated Apr. 9, 2021, 41 pages.
Non-Final Office Action received for U.S. Appl. No. 16/779,208 dated Apr. 20, 2021, 71 pages.

(56) References Cited

OTHER PUBLICATIONS

Non-Final Office Action received for U.S. Appl. No. 16/526,142 dated Oct. 15, 2020, 21 pages.
Notice of Allowance received U.S. Appl. No. 16/228,612 dated Oct. 20, 2020, 84 pages.
Zhou, et al. "Fast Erasure Coding for Data Storage: A Comprehensive Study of the Acceleration Techniques" Proceedings of the 17th Usenix Conference on File and Storage Technologies (FAST '19), [https://www.usenix.org/conference/fast19/presentation/zhou], Feb. 2019, Boston, MA, USA. 14 pages.
Non-Final Office Action received for U.S. Appl. No. 16/010,255 dated Oct. 29, 2020, 65 pages.
Final Office Action received for U.S. Appl. No. 16/240,272 dated Oct. 27, 2020, 42 pages.
Non-Final Office Action received for U.S. Appl. No. 16/399,902 dated Oct. 28, 2020, 83 pages.
Notice of Allowance received for U.S. Appl. No. 16/374,726 dated Nov. 20, 2020, 78 pages.
Final Office Action received for U.S. Appl. No. 16/228,624 dated Dec. 1, 2020, 63 pages.
Non-Final Office Action received for U.S. Appl. No. 16/570,657 dated Nov. 27, 2020, 75 pages.
Final Office Action received for U.S. Appl. No. 16/177,285 dated Dec. 30, 2020, 61 pages.
Final Office Action received for U.S. Appl. No. 16/511,161 dated Dec. 30, 2020, 61 pages.
Non-Final Office Action received for U.S. Appl. No. 16/399,895 dated Jan. 4, 2021, 64 pages.
Notice of Allowance received for U.S. Appl. No. 16/374,726 dated Jan. 6, 2021, 56 pages.
Non-Final Office Action received for U.S. Appl. No. 16/209,185 dated Jun. 18, 2020, 22 pages.
Martin Hosken, Developing a Hyper-Converged Storage Strategy for VMware vCloud Director with VMware vSAN, Jan. 2018 (Year: 2018).
Non-Final Office Action received for U.S. Appl. No. 16/261,549 dated Apr. 15, 2020, 22 pages.
Non-Final Office Action received for U.S. Appl. No. 16/374,726 dated Jun. 2, 2020, 47 pages.
Natarajan, RAID 0, RAID 1, RAID 5, RAID 10 Explained with Diagrams, Aug. 10, 2010, thegeekstuff.com (18 pages).
Notice of Allowance received for U.S. Appl. No. 16/726,428 dated Jun. 14, 2021, 34 pages.
Thomasian et al., "Hierarchical RAID: Design, performance, reliability, and recovery", J. Parallel Distrib. Comput. vol. 72 (2012) pp. 1753-1769.
Non-Final Office Action received for U.S. Appl. No. 16/745,855 dated May 13, 2021, 71 pages.
Non-Final Office Action received for U.S. Appl. No. 16/834,649 dated Jun. 24, 2021, 61 pages.
Non-Final Office Action received for U.S. Appl. No. 16/179,486 dated May 12, 2021, 50 pages.
Non-Final Office Action received for U.S. Appl. No. 16/570,657 dated May 12, 2021, 79 pages.
Non-Final Office Action received for U.S. Appl. No. 16/670,765 dated Jul. 20, 2021, 79 pages.
Notice of Allowance received for U.S. Appl. No. 16/570,657 dated Sep. 7, 2021, 65 pages.
Ma et al., "An Ensemble of Replication and Erasure Codes for Cloud File Systems", Proceedings—IEEE INFOCOM, Apr. 2013, pp. 1276-1284.
Final Office Action received for U.S. Appl. No. 16/179,486 dated Oct. 20, 2021, 46 pages.
Final Office Action received for U.S. Appl. No. 16/177,285 dated Sep. 14, 2021, 65 pages.
Final Office Action received for U.S. Appl. No. 16/670,715 dated Sep. 7, 2021, 35 pages.
Notice of Allowance dated Sep. 10, 2021 for U.S. Appl. No. 16/745,855, 30 pages.
Office Action dated Nov. 24, 2021 for U.S. Appl. No. 16/526,182, 83 pages.
Notice of Allowance dated Nov. 22, 2021 for U.S. Appl. No. 16/888,144, 71 pages.
Non-Final Office Action received for U.S. Appl. No. 16/584,800 dated Mar. 3, 2022, 90 pages.
Non-Final Office Action received for U.S. Appl. No. 16/403,417 dated Feb. 25, 2022, 100 pages.
Non-Final Office Action received for U.S. Appl. No. 17/153,602 dated Mar. 16, 2022, 40 pages.
Notice of Allowance received for U.S. Appl. No. 17/333,793 dated Mar. 9, 2022, 39 pages.
Sun et al., "Data Management across Geographically-Distributed Autonomous Systems: Architecture, Implementation, and Performance Evaluation," IEEE Transactions on Industrial Informatics, 2019, 9 pages.
Notice of Allowance dated May 16, 2022 for U.S. Appl. No. 16/526,182, 54 pages.
Office Action dated Apr. 13, 2021 for U.S. Appl. No. 16/781,316, 21 pages.
Non-Final Office Action received for U.S. Appl. No. 16/670,715 dated Jan. 5, 2022, 22 pages.
Non-Final Office Action received for U.S. Appl. No. 16/834,649 dated Jan. 28, 2022, 26 pages.
Office Action dated Feb. 8, 2022 for U.S. Appl. No. 16/986,222, 62 pages.
Office Action dated Nov. 24, 2021 for U.S. Appl. No. 16/538,984, 30 pages.
Notice of Allowance dated Jun. 27, 2022 for U.S. Appl. No. 16/584,800, 33 pages.
Office Action dated Jun. 17, 2022 for U.S. Appl. No. 16/986,222, 76 pages.
Office Action dated Jul. 14, 2022 for U.S. Appl. No. 17/153,602, 34 pages.
Office Action dated Jun. 1, 2022 for U.S. Appl. No. 16/538,984, 114 pages.
Notice of Allowance dated Jun. 27, 2022 for U.S. Appl. No. 17/333,815, 10 pages.
Notice of Allowance dated Jun. 8, 2022 for U.S. Appl. No. 16/179,486, 67 pages.

| 4x4x2 DMC 360 | MN1 | MN2 | MN3 | MN4 |
|---|---|---|---|---|
| MD1.EXT1 | 1.2.5 | 4.1.2 | 5.4.1 | 7.1.1 |
| MD1.EXT2 | 1.3.6 | 4.2.1 | 5.2.3 | 7.1.5 |
| MD2.EXT1 | 1.4.8 | 4.4.1 | 6.2.3 | 7.4.4 |
| MD2.EXT2 | 2.1.6 | 4.4.8 | 6.3.4 | 7.4.6 |
| MD3.EXT1 | 2.4.1 | 3.1.5 | 5.4.1 | 7.2.6 |
| MD3.EXT2 | 2.4.8 | 3.2.3 | 5.4.8 | 8.1.6 |
| MD4.EXT1 | 1.1.2 | 3.3.5 | 6.1.4 | 8.3.4 |
| MD4.EXT2 | 1.1.6 | 3.4.4 | 6.1.8 | 8.4.5 |

ALLOWABLE

| 2x2x2 DMC 362 | MN1 | MN2 |
|---|---|---|
| MD1.EXT1 | ~~1.3.5~~ | ~~1.7.1~~ |
| MD1.EXT2 | 2.4.5 | 8.5.5 |
| MD2.EXT1 | 2.3.1 | 4.3.8 |
| MD2.EXT2 | 3.1.1 | 8.4.3 |

| 2x2x2 DMC 364 | MN1 | MN2 |
|---|---|---|
| MD1.EXT1 | ~~1.3.5~~ | 4.4.4 |
| MD1.EXT2 | 2.4.5 | ~~1.3.8~~ |
| MD2.EXT1 | 2.3.1 | 4.3.8 |
| MD2.EXT2 | 3.1.1 | 8.4.3 |

| 2x2x2 DMC 366 | MN1 | MN2 |
|---|---|---|
| MD1.EXT1 | ~~1.3.5~~ | 4.4.4 |
| MD1.EXT2 | 2.4.5 | 8.5.5 |
| MD2.EXT1 | 2.3.1 | ~~1.3.8~~ |
| MD2.EXT2 | 3.1.1 | 8.4.3 |

NOT ALLOWABLE

SELECTIVE INSTANTIATION OF A STORAGE SERVICE FOR A DOUBLY MAPPED REDUNDANT ARRAY OF INDEPENDENT NODES

TECHNICAL FIELD

The disclosed subject matter relates to data storage and, more particularly, to instantiating a storage service at a real storage device, wherein the storage service instance supports mapped storage via an extent(s) of a real storage device(s) of a real storage cluster(s), and wherein the instantiating is determined based on a mapping of the mapped storage to the extent(s).

BACKGROUND

Conventional data storage techniques can store data in one or more arrays of data storage devices. As an example, data can be stored in an ECS (formerly known as ELASTIC CLOUD STORAGE) system, hereinafter ECS system, such as is provided by DELL EMC. The example ECS system can comprise data storage devices, e.g., disks, etc., arranged in nodes, wherein nodes can be comprised in an ECS cluster. One use of data storage is in bulk data storage. Data can conventionally be stored in a group of nodes format for a given cluster, for example, in a conventional ECS system, all disks of nodes comprising the group of nodes are considered part of the group. As such, a node with many disks can, in some conventional embodiments, comprise a large amount of storage that can go underutilized. As an example, a storage group of five nodes, with ten disks per node, at 8 terabytes (TBs) per disk is roughly 400 TB in size. This can be excessively large for some types of data storage, however apportioning smaller groups, e.g., fewer nodes, less disks, smaller disks, etc., can be inefficient in regards to processor and network resources, e.g., computer resource usage, to support these smaller groups. As such, it can be desirable to have more granular logical storage groups that can employ portions of larger real groups, thereby facilitating efficient computer resource usage, e.g., via larger real groups, but still providing smaller logical groups that can be used more optimally for storing smaller amounts of data therein.

DETAILED DESCRIPTION

Figure 1:
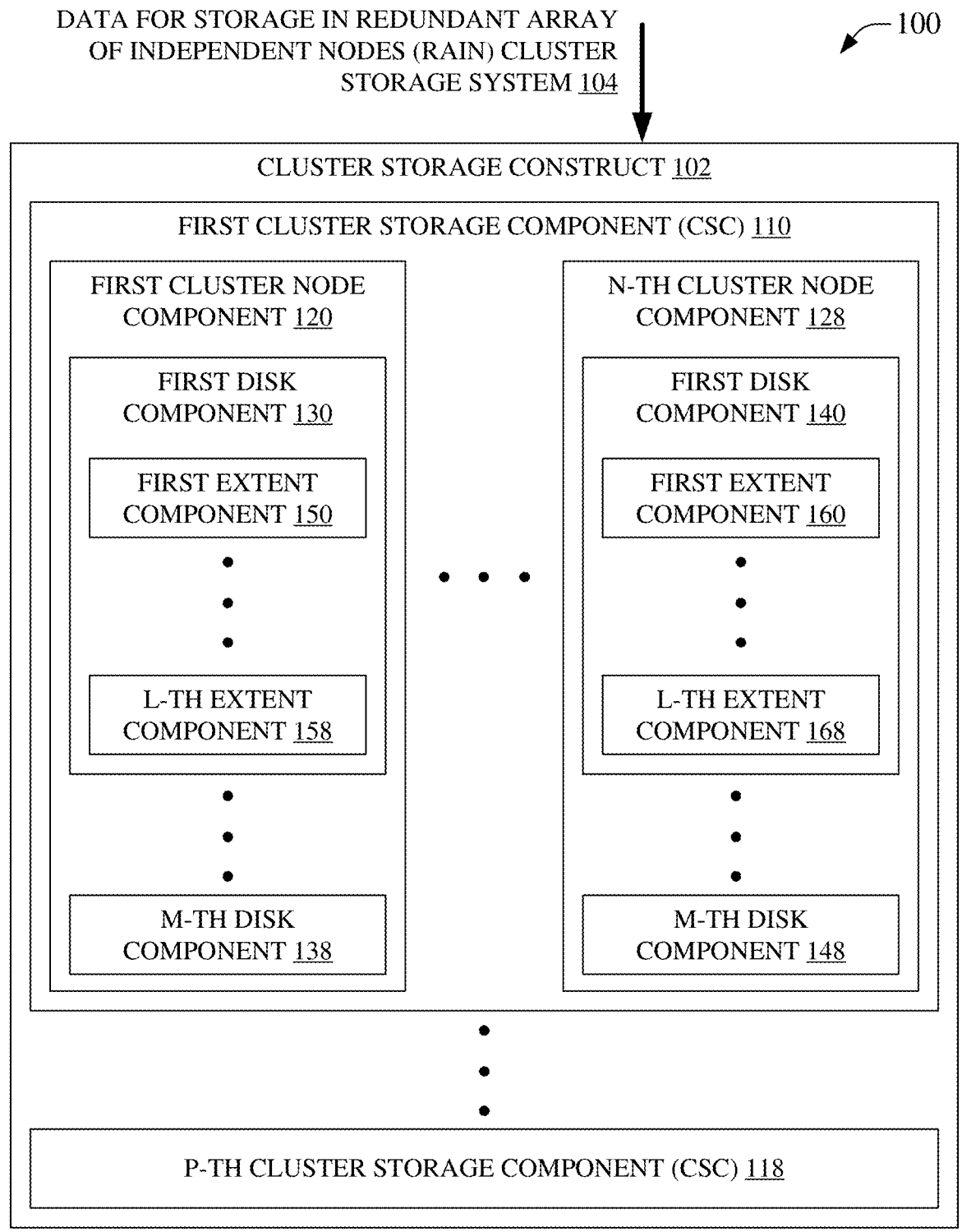
FIG. 1 is an illustration of an example system that can facilitate selective instantiation of a mapped node storage service at a real node of a doubly mapped RAIN storage system, in accordance with aspects of the subject disclosure.

The subject disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

As mentioned, data storage techniques can conventionally store data in one or more arrays of data storage devices, hereinafter a cluster, real cluster, cluster storage construct, etc. As an example, data can be stored in an ECS system such as is provided by DELL EMC. The example ECS system can comprise data storage devices, e.g., disks, etc., arranged in nodes, wherein nodes can be comprised in an ECS cluster. A data storage device can comprise one or more extent, wherein the sum of the extents of a data storage device represents the storage capacity of the data storage device, e.g., a 128 MB disk can comprise 128 extents, wherein each of the 128 extents can store approximately 1 MB of data. One use of data storage is in bulk data storage. Data can conventionally be stored in a group of nodes format for a given cluster, for example, in a conventional ECS system, all disks of nodes comprising the group of nodes are considered part of the group. As such, a node with many disks can, in some conventional embodiments, comprise a large amount of storage that can go underutilized. As such, it can be desirable to have more granular logical storage groups that can employ portions of larger real groups, thereby facilitating efficient computer resource usage, e.g., via larger real groups, but still providing smaller logical groups comprised of extents that can be used more efficiently for storing smaller amounts of data therein.

Figure 10:
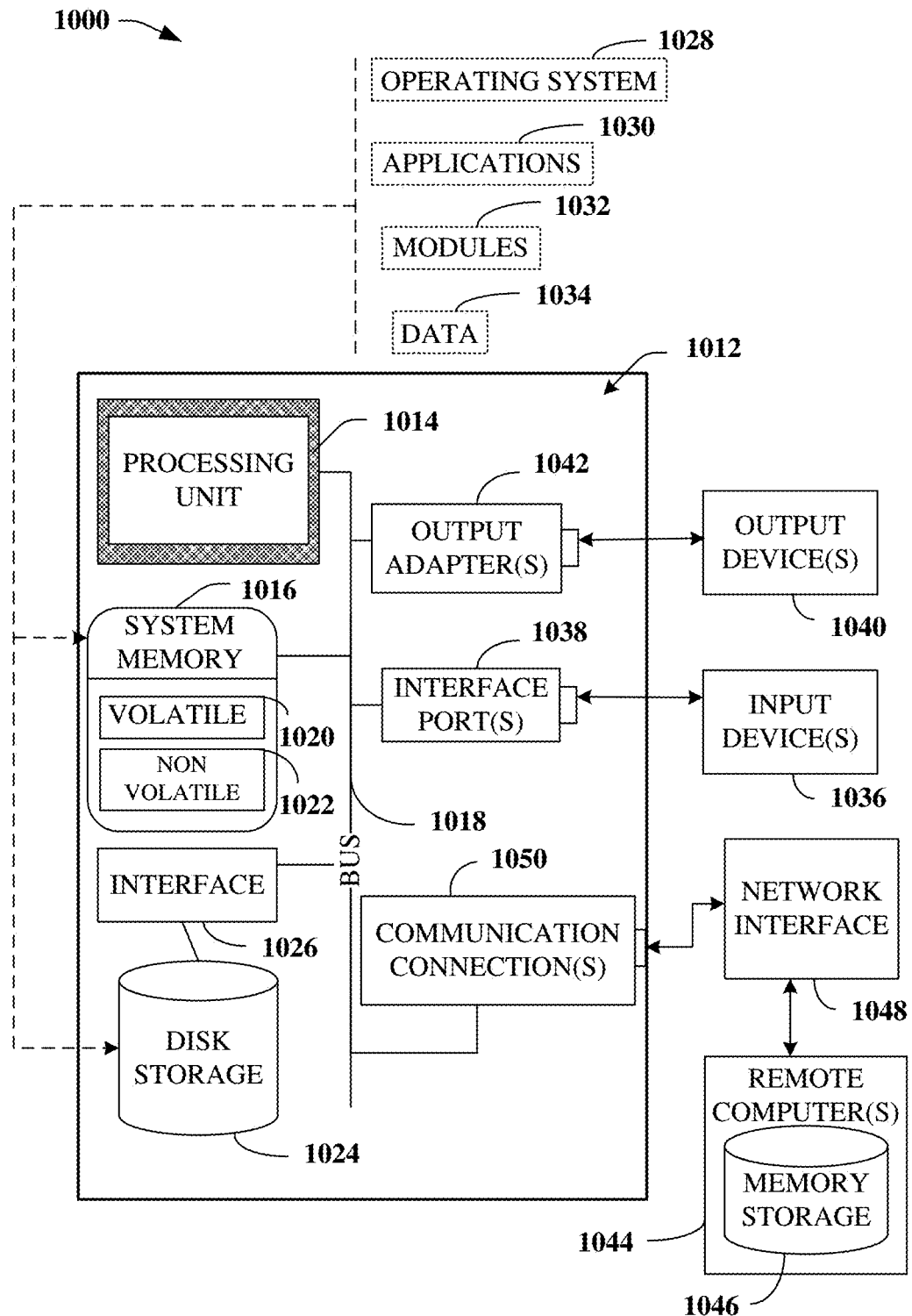
FIG. 10 illustrates an example block diagram of a computing system operable to execute the disclosed systems and methods in accordance with an embodiment.

A real cluster(s) can comprise real nodes, and the real nodes can comprise real data storage devices, which in turn can comprise extents, e.g., real extents of real disks of real nodes. Interaction with, management of, etc., the extents selected to comprise data stored via a mapped node can employ computing resources, e.g., a processor(s), memory (ies), network interface(s), user interface(s), etc., such as are illustrated at FIG. 10, etc. A real node can be a discrete hardware node that comprises real storage devices, for example a real node can comprise a rack mounted controller interacting with M hard disks, for example in a rack that can be separate from another real node that can comprise a second rank mounted controller and other real storage devices. The storage devices of these nodes can be divided into extents to enable more granular use of memory that would be experienced with entire storage devices, e.g., a storage device can be divided into L extents, etc. In an embodiment, a real node can execute operations related to control of the real node, for example, managing data storage space provided some of the L extents of the example M hard disks, of N real nodes of a real cluster, etc. Further, a real node can execute an instance of a mapped cluster storage service that can enable the virtualization of real storage space into doubly mapped clusters that can span real extents of real nodes of a real cluster(s), e.g., interaction between MCSS instances executing on different real node computing resources can enable data interaction via a mapped cluster comprising mapped nodes comprising mapped disks that store data via real extents of real disks of real nodes of real clusters.

In an embodiment of the presently disclosed subject matter, a doubly mapped redundant array of independent nodes, hereinafter a doubly mapped RAIN, can comprise a doubly mapped cluster, wherein the doubly mapped cluster can comprise a logical arrangement of storage locations of real extents of real storage devices. A real cluster(s), e.g., a group of real storage devices comprised in one or more hardware nodes that can be comprised in one or more clusters, can be allocated so as to allow more granular use of the real cluster in contrast to conventional storage techniques, e.g., doubly mapped clusters can be built above a real cluster to allow the real cluster to be used with more granularity. As an example, in conventional techniques, multiple real nodes of a real cluster can be dedicated for use by a customer, while in contrast, multiple doubly mapped nodes can be dedicated for use by the customer where each doubly mapped node can map to a portion of a real disk of a real node, thereby enabling the customer to use only a portion of the corresponding multiple real nodes, e.g., a more granular use of the real node storage space. In an aspect, a doubly mapped cluster can comprise doubly mapped nodes that can provide data redundancy that, in an aspect, can allow for failure of a portion of one or more doubly mapped nodes of the doubly mapped cluster without loss of access to stored data, can allow for removal/addition of one or more nodes from/to the doubly mapped cluster without loss of access to stored data, etc. As an example, a doubly mapped cluster can comprise doubly mapped nodes having a data redundancy scheme analogous to a redundant array of independent disks (RAID) type-6, e.g., RAID6, also known as double-parity RAID, etc., wherein employing a doubly mapped node topology and two parity stripes on each doubly mapped node can allow for two doubly mapped node failures before any data of the doubly mapped cluster can become less accessible, etc. In other example embodiments, a doubly mapped cluster can employ other doubly mapped node topologies and parity techniques to provide data redundancy, e.g., analogous to RAID0, RAID1, RAID2, RAID3, RAID4, RAID5, RAID6, RAID0+1, RAID1+0, etc., wherein a doubly mapped node of a doubly mapped cluster can comprise one or more doubly mapped disks, and the doubly mapped node can be loosely similar to a disk in a RAID system. Unlike RAID technology, an example doubly mapped RAIN system can provide access to more granular storage in, for example, very large data storage systems that can often on the order of terabytes, petabytes, exabytes, zettabytes, or even larger, because each doubly mapped node can generally comprise a plurality of doubly mapped disks, unlike RAID technologies.

In an embodiment, software, firmware, etc., can hide an abstraction doubly mapping nodes in a doubly mapped RAIN system, e.g., a group of doubly mapped nodes can appear to be a contiguous block of data storage even where, for example, it can be embodied via multiple extents of one or more real disks, multiple real groups of hardware nodes, multiple real clusters of hardware nodes, multiple geographic locations, etc. For a given real cluster, e.g., real RAIN, that is N real nodes wide, M real disks deep, and L real extents high, a doubly mapped cluster, e.g., a doubly mapped RAIN, can consist of up to N' mapped nodes that each manage up to M' mapped disks employing as many as M'×L' real extents, e.g., a doubly mapped RAIN can store data on up to N×M×L extents of a real cluster, although it can be common that the real cluster can support multiple doubly mapped RAINs that can each use fewer than the total number of extents of the real cluster wherein the sum of the participating extents supporting all of the multiple doubly mapped RAINs does not exceed the total number of extents of the real cluster. Accordingly, in an embodiment, one example doubly mapped node of size X can comprise mapped disks corresponding to one or more real extents of one or more real disks of one or more real nodes of one or more real clusters, wherein the size of available storage space of the one or more real clusters is greater than or equal to X. Similarly, in an embodiment, extents of one or more real disks of one real nodes of one or more real clusters can be readily be managed by mapped nodes of one or more doubly mapped clusters.

In some embodiments, a rule can be employed in allocating a doubly mapped cluster. As an example, according to a data loss protection rule, etc., a doubly mapped cluster can be prohibited where it would employ two extents of one real disk in different mapped disks of one doubly mapped RAIN, e.g., this can protect against loss of one real disk from affecting two mapped disks of a doubly mapped RAIN. In this example, where a first mapped disk can store data and a second mapped disk can store protection data for the stored data of the first mapped disk, then loss of both the first and second mapped disk can result in a data loss event and, accordingly, it can be a best practice to prohibit doubly mapped clusters that risk this type of data loss exposure via employing two extents of one real disk in different mapped disks of one doubly mapped RAIN. As another example, according to another data loss protection rule, etc., a doubly mapped cluster can be prohibited where it would employ two real disks of one real node in different mapped nodes of one doubly mapped RAIN, e.g., this can protect against loss of one real node from affecting two mapped disks of a doubly mapped RAIN. In this example, where a first mapped disk can store data and a second mapped disk can store protection data for the stored data of the first mapped disk, then loss of both the first and second mapped disk can result in a data loss event and, accordingly, it can be a best practice to prohibit doubly mapped clusters that risk this type of data loss exposure via employing two real disks of one real node in different mapped disks of one doubly mapped RAIN. In other embodiments, a data loss protection rule can correspond to other mapped cluster schema to offer protection against the loss of more or less mapped nodes, e.g., in some embodiments where the mapped cluster redundancy is designed to withstand a loss of two mapped nodes, the related data loss protection rule can allow for one real node to support mapped disks from two mapped nodes of the same mapped cluster. It is noted that all such data loss protection rules are considered within the scope of the present disclosure even where not explicitly recited for the sake of clarity and brevity.

Whereas an extent of a real disk can be comprised in a real node that can be comprised in a real cluster, and, whereas an extent of a real disk can correspond to a portion of a doubly mapped disk, a doubly mapped disk can then comprise one or more extents of one or more real disks, a doubly mapped node can comprise one or more extents of one or more real nodes, a doubly mapped cluster can comprise one or more extents of one or more real clusters, etc., and, for convenience, the terms 'doubly' and 'RAIN' can be omitted for brevity, e.g., a doubly mapped RAIN cluster can be referred to simply as a mapped cluster, a doubly mapped RAIN node can simply be referred to as a mapped node, etc., wherein 'mapped' is intended to convey that the doubly mapped node is an abstraction of a portion of real storage space that can be distinct from an entire real disk, an entire real node, etc., and corresponding real physical hardware component(s) and/or computing resource(s) of the real disk/node/cluster/etc., e.g., while data is actually stored on a real cluster/node/disk/extent, the data storage can abstracted to appear as being stored in a doubly mapped cluster/node/disk such that one or more doubly mapped cluster/node/disk can be 'built on top' of a real cluster/node/disk/extent. As an example, a data storage customer can use a doubly mapped cluster for data storage whereby the storage data is actually stored in various real extents of various data storage locations of a real data storage system, e.g., a real cluster, etc., according to a logical mapping between the real cluster and the doubly mapped cluster. This example can enable the doubly mapped cluster to have more granular data storage than in conventional allocation of storage space from real clusters.

In an embodiment, storage of data via a mapped cluster can be via a real cluster, e.g., the mapped cluster can be of size N' mapped nodes by M' mapped disks each comprising up to L' mapped extents, and the real cluster can be N real nodes by M real disks comprising up to L extents per real disk in size, where N'=N, M'=M, and L'=L. In other embodiments, N' can be less than, or equal to, N, M' can be less than, or equal to, M, and/or L' can be less than, or equal to, L. It will be noted that in some embodiments, M' can be larger than M, e.g., where the mapping of a M real disks into M' mapped disks portions comprises use of a part of one of the M disks, for example, 10 real disks (M=10) can be mapped to 17 mapped disk portions (M'=17), can be mapped to 11 mapped disk portions (M'=11), can be mapped to 119 mapped disk portions (M'=119), etc. It will be further noted that in some embodiments, L' can be larger than L, e.g., where a mapped disk comprises L(1)'+L(2)' . . . +L(M)' extents, for example, extents of two mapped nodes (N=2), each of 10 real disks (M=10), wherein each real disk comprises 12 extents (L=12), for a total of 240 real extents, can be mapped to an example mapped cluster having a mapped disk comprised of 18 real extents, e.g., one extent from each of nine real disks of the first real node and each of nine real disks of the second real node; ten extents of one real disk of the first real node and nine extents of another real disk of the second real node; ten extents of one real disk of the first real node and one extent of each of nine real disks of the second real node; etc. Numerous other permutations are possible in assigning extents of real disks to support mapped disks/nodes/clusters and all such permutations, combinations, etc., are within the scope of the subject disclosure even where not explicitly recited for the sake of clarity and brevity.

In some embodiments, the mapped cluster can be smaller than the real cluster. Moreover, where the mapped cluster is sufficiently small in comparison to the real cluster, the real cluster can accommodate one or more additional mapped clusters. In an aspect, where mapped clusters are smaller than a real cluster, the mapped cluster can provide finer granularity of the data storage system. As an example, where the real cluster is 8×8×8, e.g., 8 real nodes by 8 real disks by 8 extents per real disk, then, for example, four mapped 4×4×8 clusters can be provided, wherein each of the four mapped 4×4×8 clusters is approximately ¼th the size of the real cluster. As a second example, given an 8×8×8 real cluster 64 mapped 2×2×2 clusters can be provided where each mapped cluster is approximately 1/64th the size of the real cluster. As a third example, for the 8×8×2 real cluster, 2 mapped 4×8×2 or 8×4×2 clusters can be provided and each can be approximately ½ the size of the real cluster. Additionally, the example 8×8×8 or 8×8×2 real cluster can provide a mix of different sized mapped clusters, for example one 8×4×8 mapped cluster, one 4×4×8 mapped cluster, and four 2×2×8 mapped clusters; etc. In some embodiments, not all of the real cluster must be comprised in one or more mapped cluster(s), e.g., an example 8×8×8 real cluster can comprise only one 2×4×2 mapped cluster with the rest of the real cluster not (yet) being allocated into mapped storage space. In a further aspect, L for each of the M disks ban be, but need not be, the same value, e.g., real disk 1 can be 10 extents, e.g., L(1)=10, real disk 2 can be 12 extents, e.g., L(2)=12, real disk 3 can be 10 extents, e.g., L(3)=10, real disk 4 can be 1 extent, e.g., L(4)=1, etc. Moreover, the different disks can be the same or different size, e.g., disk 1 can be 128 megabytes (MB), disk 2 can be 512 MB, disk 3 can be 1 terabyte (TB), etc. Similarly, different real nodes can be of the same or different sizes.

A doubly mapped RAIN can, in some embodiments, comprise a processor, a virtual processor executing on a real processor, a combination of real processors and virtual processors, etc., that can enable interaction with data "stored in a doubly mapped cluster," e.g., a data representation corresponding to real data stored on one or more real clusters. The data stored in a doubly mapped cluster can actually correspond to real data stored on an extent of extents of a disk of a node of a real cluster, but can be interacted with according to a logical relation, e.g., to a representation said to be 'stored in the doubly mapped cluster.' As such, writing data into a logical address of the doubly mapped cluster can result in writing of the data into a physical data storage element addressed in the real cluster and an association between the doubly mapped cluster address and the real cluster address can be retained to allow other operations with the data, e.g., via operations directed to the logical representation but performed on the real data. In an aspect, the retention of the real-to-mapped address relationship, e.g., doubly mapped data corresponding to the real data, etc., can be via nearly any technique, for example, via a mapping table, via a data structure, etc., and all such techniques are within the scope of the present disclosure. Additionally, the relationship is typically updatable, allowing, for example, movement of data at the real cluster to still relate to an unchanged doubly mapped address, allowing movement of the doubly mapped data to still relate to unmoved data at the real address, etc. As an example, where a node of a real cluster fails, the relationship to the doubly mapped address can be updated to associate a redundant duplicate of the data of the real cluster to be associated with the doubly mapped address, thereby allowing a user of the doubly mapped cluster to operate on the data without disturbance. As another example, moving data in a doubly mapped cluster environment can be decoupled from actually moving the data within the real cluster, e.g., the updated doubly mapped address can be affiliated with the unchanged real address, etc. As a further example, a failure of a doubly mapped node, which is not related to a failure of a real node, can be compensated for by providing access to the real data at the unhanged real cluster address via a redundant doubly mapped cluster node. Numerous other examples of doubly mapped RAIN technology are readily appreciable and are considered within the scope of the present disclosure even where not recited for clarity and brevity.

In an aspect an instance of a storage service can enable interaction with data stored via a mapped disk of a mapped node, e.g., writing, reading, modifying, moving, copying, duplicating, deleting, freeing, etc., of data in a mapped cluster abstraction can be performed on data of a real extent of a real disk of a real node of a real cluster via an instance of a storage service. In an embodiment, an instance of a storage service, herein after simply a 'storage service' for clarity and brevity, can execute on a component of a real cluster storage system, on a component communicatively coupled to a real cluster storage system, etc. In some embodiments, the storage service can execute in a dedicated component, for example a mapped cluster control component, e.g., 220, etc., that can be local to, or located remotely from, a real disk of a real cluster. In some embodiments, the storage service can execute on a component of a real node, e.g., on a computing resource of a hardware node, etc., comprised in the real cluster. As an example, an example real cluster can be comprised of eight real nodes in a data center, wherein each real node comprises M real disks, wherein each real node comprises computing resources, and wherein the computing resources can support execution of one or more instances of storage services to enable building a mapped cluster on top of the real cluster. It can be appreciated that executing a storage service on the 8th real node of the cluster to support a mapped node of the mapped cluster storing data via real disks of the 1st real node, e.g., the mapped node maps to extents of the 1st real node, can entail interaction between the computing resources of the 1st and 8th real node. This interaction can be an extraneous burden on computing resources in comparison to performing the storage service on the 1st real node where the storage service can more directly support the data stored on the extents of the 1st real node without the extra communications to the 8th real node previously noted. Accordingly, it can be desirable to instantiate storage service instances based on a mapping of mapped clusters to extents of real clusters, wherein extents of real clusters indicates extents of disks of nodes of a the example real cluster.

In some embodiments, a performance of computing resources can act as a further metric to the selective instantiation of a storage service. Returning to the previous example, where the 1st real node computing resources are, for example, determined to be inappropriate for executing the instance of the storage service, it can be desirable to then instantiate the storage service on another real node, for example the 8th real node, even though the data is stored via the extents of the 1st real node. The analysis of computing resources of a real node can indicate a level performance that can be employed in determining if that real node is appropriate to execute a storage service waiting to be assigned. In an iteration of the previous example, the 1st real node can comprise fewer and older processors than the 8th real node, which can be used to determine that executing the storage service on the 1st real node can have lower performance than execution on the 8th real node even where there is additional computing resource overhead in signaling between the 1st and 8th real nodes. In another iteration of the previous example, the 1st real node can already be executing other instances of storage services, e.g., for other mapped nodes, etc., and it can be determined that executing a further storage service would degrade performance sufficiently that it then becomes preferable to execute the further storage service on the 8th real node even where there is additional computing resource overhead in signaling between the 1st and 8th real nodes. In a yet further iteration of the previous example, the 1st real node can be scheduled to be repaired and storage services, etc., can be in the process of being moved to other real nodes, which can cause the further instance of the storage service to be performed on another real node computing resource, e.g., it can be likely that the data of the mapped node and the instance of the corresponding storage service can be moved to the same real node, e.g., the 8th real node in this example. Numerous other computing resource performance metrics can be determined and employed in the selective instantiation of a storage service and are to be considered within the scope of the instant subject matter even where not explicitly recited for the sake of clarity and brevity. Examples of other metrics can include, processor factors such as count, speed, etc., memory factors such as an amount of memory, speed, throughput, etc., network factors such as bandwidth, cost, latency, reliability, etc., location, reliability, monetary cost, geopolitical factors, etc. Moreover, in some embodiments, a mapped cluster can comprise storage space from more than one real cluster. In some embodiments, a mapped cluster can comprise storage space from real nodes in different geographical areas. In some embodiments, a mapped cluster can comprise storage space from more than one real cluster in more than one geographic location. As an example, a mapped cluster can comprise storage space from a cluster having hardware nodes in a data center in Denver. In a second example, a mapped cluster can comprise storage space from a first cluster having hardware nodes in a first data center in Denver and from a second cluster also having hardware nodes in the first data center in Denver. As a further example, a mapped cluster can comprise storage space from both a cluster having hardware nodes in a first data center in Denver and a second data center in Denver. As a still further example, a mapped cluster can comprise storage space from a first cluster having hardware nodes in a first data center in Seattle, Wash., and a second data center having hardware nodes in Tacoma, Wash. As yet another example, a mapped cluster can comprise storage space from a first cluster having hardware nodes in a first data center in Houston, Tex., and a second cluster having hardware nods in a data center in Mosco, Russia. Accordingly, in regards to selective instantiation of storage services can comprise determining computer resource metrics that reflect the topology of one or more real clusters/nodes/disks/etc., and their supporting computing resource(s). As an example, a real cluster can comprise data storage in a first data center located in Seattle, which can be subject to earthquakes, frequent violent political events, etc., and in a second data center located in Spokane, which can be less prone to earthquakes and political events, whereby it can have a higher computing resource cost to execute a storage service in Seattle to support data physically stored in Spokane. However, where the cost of storing data in Spokane nodes can be far less costly (e.g., lower monetary cost, lower risk of loss in a political riot/earthquake, etc.), and where there can be more up-to-date computing resources in Seattle nodes, there can be situations where it can be desirable to execute a storage service instance in Seattle for data physically stored in Spokane.

To the accomplishment of the foregoing and related ends, the disclosed subject matter, then, comprises one or more of the features hereinafter more fully described. The following description and the annexed drawings set forth in detail certain illustrative aspects of the subject matter. However, these aspects are indicative of but a few of the various ways in which the principles of the subject matter can be employed. Other aspects, advantages, and novel features of the disclosed subject matter will become apparent from the following detailed description when considered in conjunction with the provided drawings.

FIG. 1 is an illustration of a system 100, which can facilitate selective instantiation of a mapped node storage service at a real node of a doubly mapped RAIN storage system, in accordance with aspects of the subject disclosure. System 100 can comprise a cluster storage construct 102, which can be embodied in a cluster storage system. In an embodiment, cluster storage construct 102 can be embodied in a real cluster storage system comprising one or more hardware nodes that each comprise one or more storage devices, e.g., hard disks, optical storage, solid state storage, etc. Moreover, each real storage device can comprise one or more extents. An extent can be a defined portion of the real storage device, e.g., a real disk can be logically divided into extents, and the extents can comprise data storage locations that can facilitate data operations according to the storage locations. It is noted that a disk of a stated size can typically comprise less than the stated size of useable storage, a common convention, wherein a portion of the stated size is generally reserved for operational overhead, e.g., a 4 TB drive may have less than 4 TB of useable storage where the drive uses a portion of the 4 TB for a basic input output system (BIOS), etc. Accordingly, the extents of a disk can also differ from the stated size for similar reasons. In an aspect, extents can be of a unit size, for example, an extent can be 500 gigabytes (GB), such that a 5 terabyte (TB) disk can comprise 10 extents and an 8 TB disk can comprise 16 extents, again, as noted herein, the extents may not be exactly 500 GB due to some of the stated disk space being otherwise allocated, but the extents can be of the same unit size. As is noted hereinabove, in some embodiments, extents can be of other than a unit size without departing form the scope of the subject disclosure even where not discussed in more detail herein for the sake of clarity and brevity. Use of unit sized and/or non-unit sized extents, in some embodiments, can enable a real cluster to support doubly mapped clusters corresponding to extents of real disks, rather than whole real disks, wherein the doubly mapped cluster can employ part of a real disk, e.g., can correspond to part of the real disk. Moreover, an extent unit size can enable use of different sized real disks in the real cluster without complicating allocation of storage space in the doubly mapped cluster. As an example, in a singly mapped cluster, whole real disks can be mapped, e.g., a mapped disk can correspond to a whole real disk and, accordingly, it can be more complex to allocate a mapped cluster based on a real cluster having mixed disk sizes, for example, because this can result in different sizes of mapped disks that can complicate redundant data storage in the mapped cluster construct. In contrast, different sizes of real disks in a real cluster with doubly mapped cluster technology is immaterial because the doubly mapped cluster can map equal sized extents and redundant data storage can therefore be less complex. As an example, if a real node comprises a 1 TB drive and an 8 TB drive, then a mapped node can comprise a 1 TB mapped drive and an 8 TB mapped drive which can complicate redundant storage because loss of one of the mapped drives can result in data loss unless more complex redundant data storage techniques are employed to preserve data in case of a lost mapped drive. In this example, if doubly mapped cluster technology is employed with a 1 TB extent size, then there can be 9 extents in the real drives and a doubly mapped cluster can comprise two four extent doubly mapped disks allowing for less complex data redundant storage techniques to be employed. Additionally, for this example, the granular size is 9 TB in the singly mapped cluster, and can be as low as 2 TB in the doubly mapped cluster.

In system 100, cluster storage construct 102 can receive data for storage in a mapped cluster, e.g., data for storage in RAIN cluster storage system 104, etc., hereinafter data 104 for brevity. Data 104 can be stored by portions of the one or more storage devices of cluster storage construct 102 according to a logical mapping of the storage space, e.g., according to one or more doubly mapped clusters. In an aspect, a doubly mapped cluster can be a logical allocation of storage space comprised in cluster storage construct 102. In an embodiment, a portion, e.g., addressable storage element, of an extent of a real disk can be comprised in an extent of a real disk that can be comprised in a real node that can be comprised in a real cluster and, furthermore, an addressable storage element of the real cluster can correspond to a portion of a doubly mapped cluster, etc. Accordingly, in an embodiment, cluster storage construct 102 can support a doubly mapped cluster enabling data 104 to be stored on one or more addressable storage element of an extent, e.g., first extent component 150 through L-th extent 158, of a real disk, e.g., first disk 130 through M-th disk component 138 of a real cluster, e.g., first cluster node component 120 through N-th cluster node component 128 of a cluster storage component (CSC), e.g., first CSC 110 through P-th CSC 118, and correspond to a doubly mapped cluster schema. Whereas each disk comprises extents, e.g., first disk component 130 comprises first extent component 150 through L-th extent component 158, first disk component 140 comprises first extent component 160 through L-th extent component 168, etc., the total number of extents of cluster storage construct 102 can be determined by summing the number of extents in each disk of each node of each cluster for all clusters, nodes, and disks, e.g., for a single cluster system, an 8×8×8 cluster can have 512 extents of a determined size. In an aspect, a mapped cluster control component, e.g., mapped cluster control component 220, etc., can coordinate storage of data 104 on storage elements of a real cluster of cluster storage construct 102 according to relationships between the mapped data storage space and the real data storage space, e.g., mapped cluster control component 220, etc., can indicate where in cluster storage construct 102 data 104 is to be stored, cause data 104 to be stored at a location in cluster storage construct 102 based on a mapping of the mapped cluster, etc.

In an embodiment, a doubly mapped cluster built on top of cluster storage construct 102 can correspond to one or more portions of one or more real cluster, e.g., to a portion of an extent of one or more disks of one or more nodes of one or more real clusters. Moreover, the mapped cluster can be N' nodes by M' disks by L' extents in size and the one or more real clusters of cluster storage construct 102 can be N nodes by M disks by L extents in size.

In some embodiments, a doubly mapped cluster can correspond to storage space from more than one real cluster, e.g., first CSC 110 through P-th CSC 118 of cluster storage construct 102. In some embodiments, a doubly mapped cluster can correspond to storage space from real nodes in different geographical areas. In some embodiments, a doubly mapped cluster can correspond to storage space from more than one real cluster in more than one geographic location. As an example, a doubly mapped cluster can correspond to storage space from a cluster having hardware nodes in a data center in Denver, e.g., where first CSC 110 is embodied in hardware of a Denver data center. In a second example, a doubly mapped cluster can correspond to storage space from a first cluster having hardware nodes in a first data center in Denver and from a second cluster also having hardware nodes in the first data center in Denver e.g., where first CSC 110 and P-th CSC 118 are embodied in hardware of a Denver data center. As a further example, a doubly mapped cluster can correspond to storage space from both a cluster having hardware nodes in a first data center in Denver and a second data center in Denver e.g., where first CSC 110 is embodied in first hardware of a first Denver data center and where P-th CSC 118 is embodied in second hardware of a second Denver data center. As a further example, a doubly mapped cluster can correspond to storage space from a first cluster having hardware nodes in a first data center in Seattle, Wash., and a second data center having hardware nodes in Tacoma, Wash., e.g., where first CSC 110 is embodied in first hardware of a first Seattle data center and where P-th CSC 118 is embodied in second hardware of a second Tacoma data center. As another example, a doubly mapped cluster can correspond to storage space from a first cluster having hardware nodes in a first data center in Houston, Tex., and a second cluster having hardware nods in a data center in Mosco, Russia e.g., where first CSC 110 is embodied in first hardware of a first Houston data center and where P-th CSC 118 is embodied in second hardware of a second Mosco data center.

In an aspect, a mapped cluster control component, e.g., 220, etc., can allocate storage space of cluster storage component 102 based on an indicated level of granularity. In an aspect, this indicated level of granularity can be determined based on an amount of data to store, a determined level of storage space efficiency for storing data 104, a customer/subscriber agreement criterion, an amount of storage in cluster storage construct 102, network/computing resource costs, wherein costs can be monetary costs, heat costs, energy costs, maintenance costs, equipment costs, real property/rental/lease cost, or nearly any other costs. In an aspect, these types of information can be termed 'supplemental information', e.g., 222, etc., and said supplemental information can be used to allocate mapped storage space in a doubly mapped cluster and the corresponding space in a real cluster storage construct 102. In some embodiments, allocation can be unconstrained, e.g., any space of cluster storage component 102 can be allocated into a doubly mapped cluster. In other embodiments, constraints can be applied, e.g., a constraint can be employed by a doubly mapped cluster control component to select or reject the use of some storage space of cluster storage construct 102 when allocating a doubly mapped cluster. As an example, see FIG. 3, a first constraint can restrict allocating two doubly mapped clusters that each use a disk from the same real node because difficulty accessing the real node can result in effects on two doubly mapped clusters, a second constraint can restrict allocating two doubly mapped disks of one doubly mapped cluster from using extents from the same real disk because difficulty accessing the real disk can result in effects on the two doubly mapped disks. Other constraints can be readily appreciated, for example, based on a type of data redundancy schema, based on available/use storage space, based on network/computing resource costs, etc., and all such constraints are within the scope of the instant disclosure even where not recited for clarity and brevity.

Figure 2:
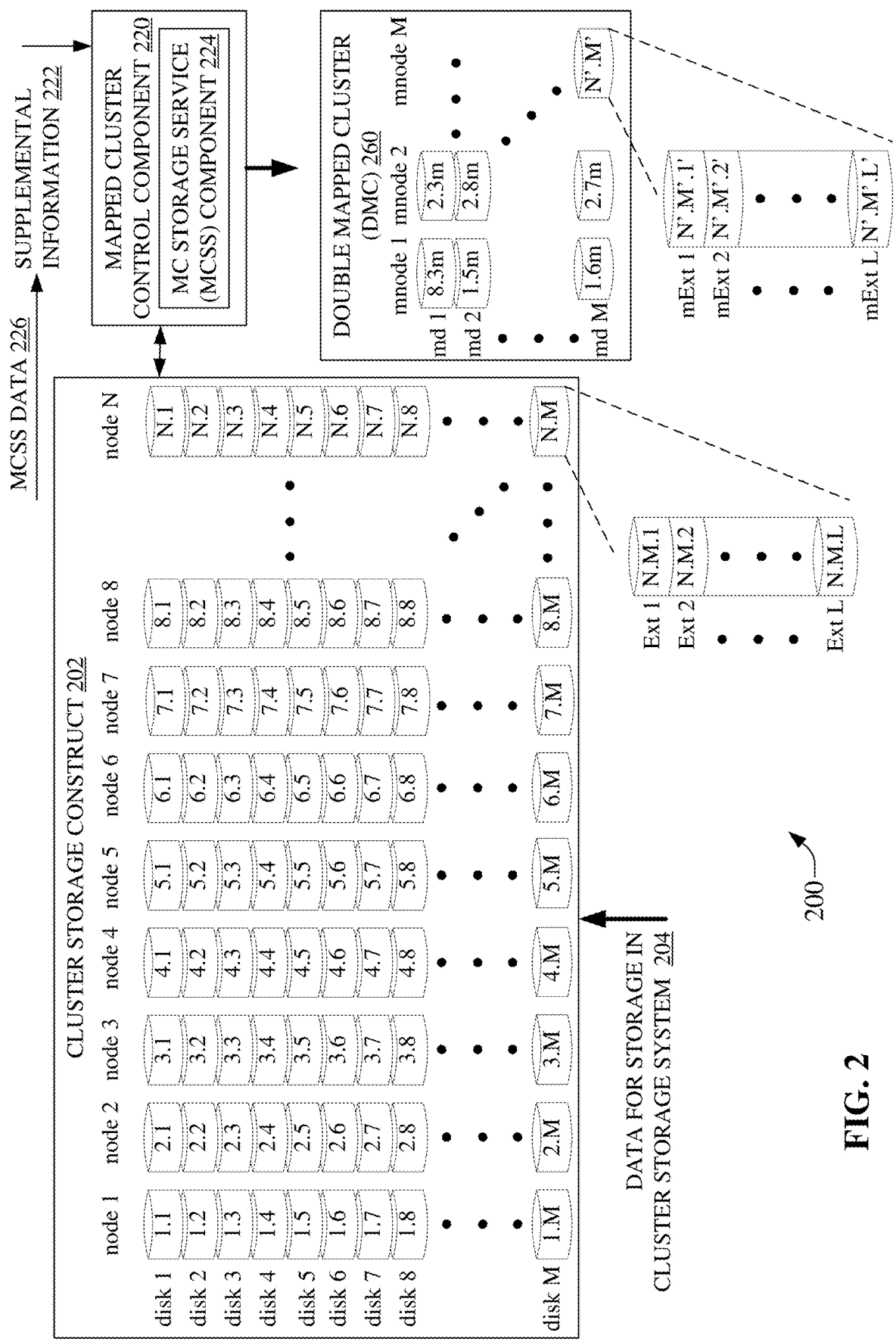
FIG. 2 is an illustration of an example system that can facilitate selective instantiation of a mapped node storage service at a real node of a doubly mapped RAIN storage system based on a mapping of mapped extents to real disks, in accordance with aspects of the subject disclosure.

FIG. 2 is an illustration of a system 100, which can facilitate selective instantiation of a mapped node storage service at a real node of a doubly mapped RAIN storage system based on a mapping of mapped extents to real disks, in accordance with aspects of the subject disclosure. System 200 can comprise cluster storage construct 202 that can be the same as, or similar to, cluster storage construct 102. Cluster storage construct 202 is illustrated at the disk and node level for ease of illustration, e.g., disk 1.1 indicates disk 1 of node 1. As used herein, the disk, node, and extent can be typically depicted as N.M.L in real components, N'.M'.L' in mapped components, etc., such that, for example, data stored at 1.1.1 is stored at an addressable storage location of real node 1, real disk 1, real extent 1, data stored at 4'.3'.8' is stored "at" an addressable storage location corresponding to mapped node 4, mapped disk 3, mapped extent 8, etc. As is illustrated in system 200, cluster storage construct 202 can comprise N nodes of M disks, e.g., disk 1.1 to N.M, etc. Moreover, each of the M disks of the N nodes can comprise L extents, see the flyout of disk N.M of cluster storage construct 202 that comprises L extents, e.g., N.M.1 through N.M.L.

Mapped cluster control component 220 can be communicatively coupled to, or be included in, cluster storage construct 202. Mapped cluster control component 220 can allocate doubly mapped cluster (DMC) 260, which can logically embody storage comprised in cluster storage construct 202. In an embodiment, DMC 260 can be allocated based on supplemental information 222. As an example, supplemental information 222 can indicate a first amount of storage is needed and mapped cluster control component 220 can determine a number of, and identity of, extents of disks of nodes of cluster storage construct 202 to meet the first amount of storage. Mapped cluster control component 220, in this example, can accordingly allocate the identified extents, disks, and nodes of cluster storage construct 202 as corresponding to doubly mapped nodes (mnode, mn, etc.), disks (mdisk, md, etc.), and extents (mextent, mExt, etc.) of DMC 260, e.g., extents of disk 8.3m can correlate to an allocation of extents of disk 8.3, . . . , extents of disk N'.M' can correlate to an allocation of disk N.M, etc. As such, similar to a real cluster, e.g., cluster storage construct 202, etc., DMC 260 can comprise mapped extents, for example, see flyout of doubly mapped disk N'.M' comprising mapped extents mExt 1 through mExt L, e.g ., N'.M'.1' through N'.M'.L'.

In an aspect, mapped cluster control component 220 can comprise mapped cluster storage service (MCSS) component 224 that can cause an instance of a storage service to be instantiated. The storage service can enable interaction with data stored via a mapped disk of a mapped node, e.g., writing, reading, modifying, moving, copying, duplicating, deleting, freeing, etc., of data in a mapped cluster abstraction can be performed on data of a real disk of a real node of a real cluster via an instance of a storage service. Instantiation of the storage service for DMC 260 can be based on data relating to a topology of extents serving DMC 260, computing resource data, etc., as is disclosed elsewhere herein, which can be embodied in MCSS data 226 that can be comprised in supplemental information 222. In some embodiments, MCSS component 224 can be comprised in other components of system 200, other components of a storage system comprising system 200, etc., and can correspondingly receive MCSS data 226 appropriately, e.g., not comprised in supplemental information 222, etc.

Mapped cluster control component 220 can facilitate storage of data 204, corresponding to data representations of DMC 260, in the allocated storage areas of cluster storage construct 202. As such, data 204 can be stored in a more granular storage space than would conventionally be available, e.g., conventionally all disks of a node can be committed to storage, e.g., a client device is conventionally 'given' a whole real node to use, even where the 1 to M disks available in the whole real node can far exceed an amount of storage space needed by the client device. As such, by mapping portions of extents of some disks from some nodes into DMC 260, a lesser amount of storage space can be made available to the client device, for example, rather than allocating a whole real node under conventional technology, with doubly mapped RAIN technology a single extent of a single disk of a single node can be allocated, which can be significantly less storage space than the whole node. As an example, where a conventional storage cluster can allocate a minimum block of 1.2 petabytes (PB), for example in a conventional ECS storage system 1.2 PB can be the minimum storage size, this can far exceed demands of a client device in many situations. Continuing the example, a singly mapped RAIN can allocate at a whole disk level and can reduce the minimum storage size considerably. Still further in the example, doubly mapped RAIN can allocate storage at the extent level to provide still further granularity of storage space and reduce the minimum allocated space even beyond singly mapped RAIN technology. As an example, where storage can be related to storing a simple log file, storing the log file in 1.2 PB of space can be extremely inefficient use of space. Similarly, in this example, even storing the log file in several TB of disk space can be highly inefficient use of storage space. As such, allocation of storage space at the disk extent level can provide levels of granularity that are much more storage space efficient.

Figure 3:
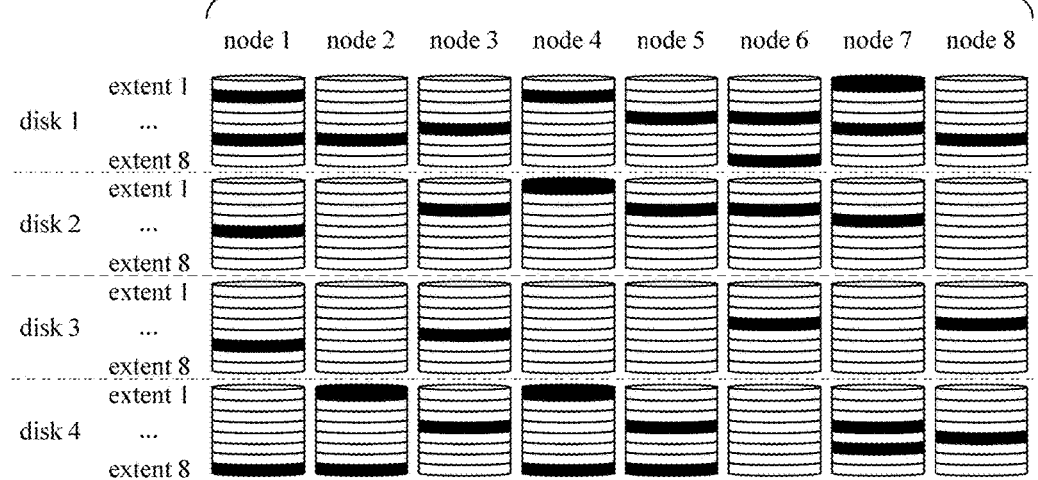
FIG. 3 is an illustration of an example system that can enable selective instantiation of a mapped node storage service at a real node of a doubly mapped RAIN storage system that can prohibit some mappings of mapped disks to extents of real disks that can be associated with a level of risk of a data loss event, in accordance with aspects of the subject disclosure.

FIG. 3 is an illustration of a system 300, which can enable selective instantiation of a mapped node storage service at a real node of a doubly mapped RAIN storage system that can prohibit some mappings of mapped disks to extents of real disks that can be associated with a level of risk of a data loss event, in accordance with aspects of the subject disclosure. System 300 can comprise can comprise real 8×4×8 cluster 302 that can comprise disk portions 1.1.1 to 8.4.8, e.g., 256 total extents, in a manner that can be the same as, or similar to, cluster storage construct 102, 202, etc. A mapped cluster control component, e.g., 220, etc., can allocate one or more DMC. Allocation of a DMC corresponding to a portion(s) of a real cluster can be subject to rules, best practices, etc.

In an embodiment, a prospective DMC can be validated before allocation, e.g., a prospective DMC can be determined to satisfy one or more rules, for example related to aspects of data protection prior to allocation. As an example, a prospective DMC employing redundant data storage techniques that allow for loss of only a single mapped node without experiencing a data loss event, can be subject to corresponding rules prior to allocation, e.g., a first rule prohibiting the mapping of disks of one real node from being employed in more than one mapped node of a mapped cluster, a second rule prohibiting the mapping of two real extents of one disk of one real node from being employed in more than one mapped node of a DMC, etc., because these rules can provide mapped node topologies that can comport with data protection schemes of DMCs to be provisioned. Application of these example rules to real 8.4.8 cluster 302 can result in provisioning of DMC 360 and prohibiting the provisioning of DMCs 362-366, etc. As an example, the example illustrated mappings of 4×4×2 DMC 360 do not result in disks of any one real node of cluster 302 from being mapped to more than one node of DMC 360 and also do not result in extents of one disk of cluster 302 being mapped to mapped disks in more than one node of DMC 360. As such, the failure of either one node or of one disk and the constituent extents can be unlikely to affect more than one node of DMC 360 and therefore can comport with a data protection scheme of DMC 360 allowing for loss of one node without a data loss event.

In contrast, each of DMCs 362-366 can fail one or more of these example rules. In DMC 362, for example, a first extent of a first mapped disk, e.g., MD1.EXT1, of each of mapped node 1, e.g., MN1, and mapped node 2, e.g., MN2 can correspond to a disk from a same real node, e.g., real node 1. Accordingly, failure of real node 1 can compromise two mapped nodes of DMC 362 and, therefore, DMC 362 can be determined to not satisfy an example first rule related to disks of one real node being prohibited in more than one mapped node of a mapped cluster, even though it can satisfy an example second rule related to extents of the same real disk being prohibited in more than one mapped node of a mapped cluster.

In proposed DMC 364, MD1.EXT1 of MN1 and MD1.EXT2 of MN2 can correspond to extents from a same real disk of cluster 302, e.g., 1.1.1m of DMC 364 can map to extent 5 of disk 3 of real node 1 and 2.1.2m can map to extent 8 of the same disk and real node of cluster 302. Accordingly, failure of disk 3 of real node 1 can result in the failure of both real extent 5 and 8, which can compromise mapped disk 1 of each of MN1 and MN2 of DMC 364. As such, DMC 364 can be determined to not satisfy the example second rule and can be determined to also not satisfy the example first rule. In an aspect, another rule, not illustrated, can prohibit mapping two real extents of a single real disk to different mapped disks in a single mapped node of a doubly mapped cluster, for example, where a data protection scheme of the doubly mapped cluster stores redundant data in different disks of a same mapped node, loss of a the real disk and the resulting loss of the extents thereof can result in loss of two mapped disks that can result in a data loss event.

In proposed DMC 366, MD1.EXT1 of MN1 and MD2.EXT1 of MN2 can correspond to extents from a same real disk of cluster 302, e.g., 1.1.1m of DMC 364 can map to extent 5 of disk 3 of real node 1 and 2.2.1m can map to extent 8 of the same disk and real node of cluster 302. Accordingly, failure of disk 3 of real node 1 can result in the failure of both real extent 5 and 8, which can compromise mapped disk 1 of MN1 and mapped disk 2 of MN2 in DMC 366. As such, DMC 366 can again be determined to not satisfy both the example first and example second rule even where the conflict occurs in different mapped disks of different mapped nodes.

FIG. 3 is an illustration of a system 300, which can facilitate selective instantiation of a mapped node storage service at a real node ordered by a count of real disks supporting a mapped node, in accordance with aspects of the subject disclosure. System 300 can comprise MCSS component 312 that can generate MCSS data 314. MCSS data 314, which can indicate an instantiation scheme(s) that can facilitate interaction with data stored via a mapped cluster built on top of a real cluster, for example, MCSS data 314 can indicate that a first instance of the storage services will execute on a first real node and will correlate to controlling data events for a first mapped node, that a second instance of the storage services will execute on a second real node corresponding to data events of a second mapped node, etc.

Mapping table 213 from FIG. 2 can be employed in determining count table 330. Mapping table 213 can indicate which real disks of real nodes are providing data storage corresponding to different mapped nodes of mapped clusters. Mapping table 213 can, for example, indicate that real node 1 (read from the left hand column) contributes real disks 1.2 and 1.4 to mapped node 1 of MC 240 and real disks 1.1. and 1.3 to mapped node 3 of MC 242; that real node 2 contributes real disk 2.1 to mapped node 2 of MC 240 and real disks 2.2, 2.3, and 2.4 to mapped node 1 of MC 242; etc. Mapping table 213 can provide an understanding of groups/counts of real disks of a real node contributing to the support of mapped nodes of mapped clusters. Analysis of mapping table 213 can facilitate instantiation of storage services on real nodes based on what real disks participate in mapped nodes of mapped clusters.

In an embodiment, count table 330 can be determined based on an analysis of mapping table 213. Count table 330 can indicate, for example, that real node 1 (again read from the left hand column) contributes two real disks to mapped node 1 of MC 240, e.g., corresponding to real disk 1.2 and 1.4, and two real disks to mapped node 3 of MC 242, e.g., corresponding to real disks 1.1 and 1.3; that real node 2 contributes one real disk to mapped node 2 of MC 240, e.g., corresponding to real disk 2.1, and three real disks to mapped node 1 of MC 242, e.g., corresponding to 2.2, 2.3, and 2.4; etc. The groups from count table 330, e.g., groups of one, two, three, four, etc., real disks, can be employed in directing where an instance of a storage service can execute. In an embodiment, storage services can be instantiated by simply rastering across mapping table 213 or count table 330. As an example, starting in the upper left corner of either mapping table 213 or count table 330, a first storage service for mapped node 1 of MC 240 can be provisioned on real node one, then a second storage service can be provisioned on real node 2 for mapped node 2 of MC 240 by skipping mapped node 3 of MC 242 because real node 1 already has one storage service, e.g., the first storage service, assigned, then a third storage service can be set at real node 3 for mapped node 1 of MC 242, etc. This embodiment, for example, can simply cause a storage service for the first mapped node being provided with real disks regardless of the count of real disks being provided. This can result in a storage service facilitating a larger group of real disks in the same mapped node but stored on another real node, e.g., the second storage service on real node 2 of the previous example also serves a group of three real disks on real node 5 because disks 5.2 to 5.4 are part of mapped node 2 of MC 240, etc.

In another embodiment, larger groups can be provisioned with an instance of a storage service before provisioning smaller groups. As an example, starting in the upper left corner of count table 330 and moving left to right then down, a first storage service can be set for the largest first largest group to be encountered, e.g., there are two groups of four real disks in count table 330, four real disks at mapped node 1 of MC 242 and four real disks at mapped node 4 of MC 240. As such, the first storage service can be instantiated on real node 3 for mapped node 1 of MC 242, then a second storage service can be provisioned on real node 7 for mapped node 4 of MC 240, then a third storage service can be set for the first group of three real disks, e.g., at real node 2 for mapped node 2 of MC 242, etc. This embodiment can cause a storage services to be instantiated by largest group first, which can place the storage service on a real node having the greatest number of real disks corresponding to a mapped node of a mapped cluster. This can reduce computing resource burdens by trying to keep the storage service instance closer to more of the real disks enabling a mapped node.

An example actions table 350 is illustrated for an embodiment of instantiating by group size from count table 330. At iteration number one, an MCSS can be assigned to real node 3 for mapped node 1 of MC 242, at iteration number two, an MCSS can be assigned to real node 7 for mapped node 4 of MC 240, at iteration number three, an MCSS can be assigned to real node 2 for mapped node 2 of MC 242, etc. At iteration number eight, it can be observed that a storage service has already been instantiated at real node 1, as can be observed at iteration number seven for mapped node 1 of MC 240. As such, causing a storage service instance for real disks 1.1 and 1.3 at real node 1 would represent a second instance of a storage service executing on real node 1. While a real node can certainly execute multiple instances of a storage service, it can be preferable, in some embodiments to distribute storage service instances, for example, to prevent bunching up of instances on just a few real nodes. However, there can be circumstances where an uneven distribution of storage services can also be preferable, for example, where computing resources are not similar across/between all real nodes, etc. As an example, where real node 1 has much greater computing resources than another real node that doesn't yet have a storage service instance, it can still be preferable to add a second storage service instance to real node 1 rather than to the other real node because of the much greater computing resources of real node 1 being determined to be able to execute multiple instances of storage services causing a real cluster to perform better than having an instance at each of real node 1 and at the other real node.

Proceeding to iteration number nine of actions table 350, it can be observed that mapped node 1 of MC 240 is already associated with an instance of a storage service, e.g., real node 1 already has an instance of a storage service for mapped node 1 of MC 240, which mapped node includes storage via real disk 6.1 and 6.4 on real node 6. As such, there can be no need to assign a second storage service instance to manage a mapped node that already being managed by a first storage service instance, and the action can be to simply move to the next iteration, e.g., at iteration number seven, a storage service instance was caused at real node 1 for mapped node 1 of MC 240, which mapped node can store data via real disks 1.2, 1.4, 6.1, and 6.4 of the real cluster, such that at iteration number nine, there is no need to cause a second storage service instance for mapped node 1 of MC 240.

At iteration numbers 11-15, similar to iteration number nine, it can be observed that the groups of real disks are already in mapped nodes that are associated with storage service instances already in execution on real nodes and, as such, there is no need to assign additional instances of storage services. Accordingly, actions table 350 can finish, as shown at iteration number 16. The actions illustrated in action table 350 can be comprised in MCSS data 314. MCSS data 314 can be employed to implement instantiation of storage services on the real nodes of the real cluster, for example, according to actions table 350, to support data interactions via a mapped cluster built on top of a real cluster in a manner that places storage service instances closer to larger counts of real disks associated with mapped nodes.

Figure 4:
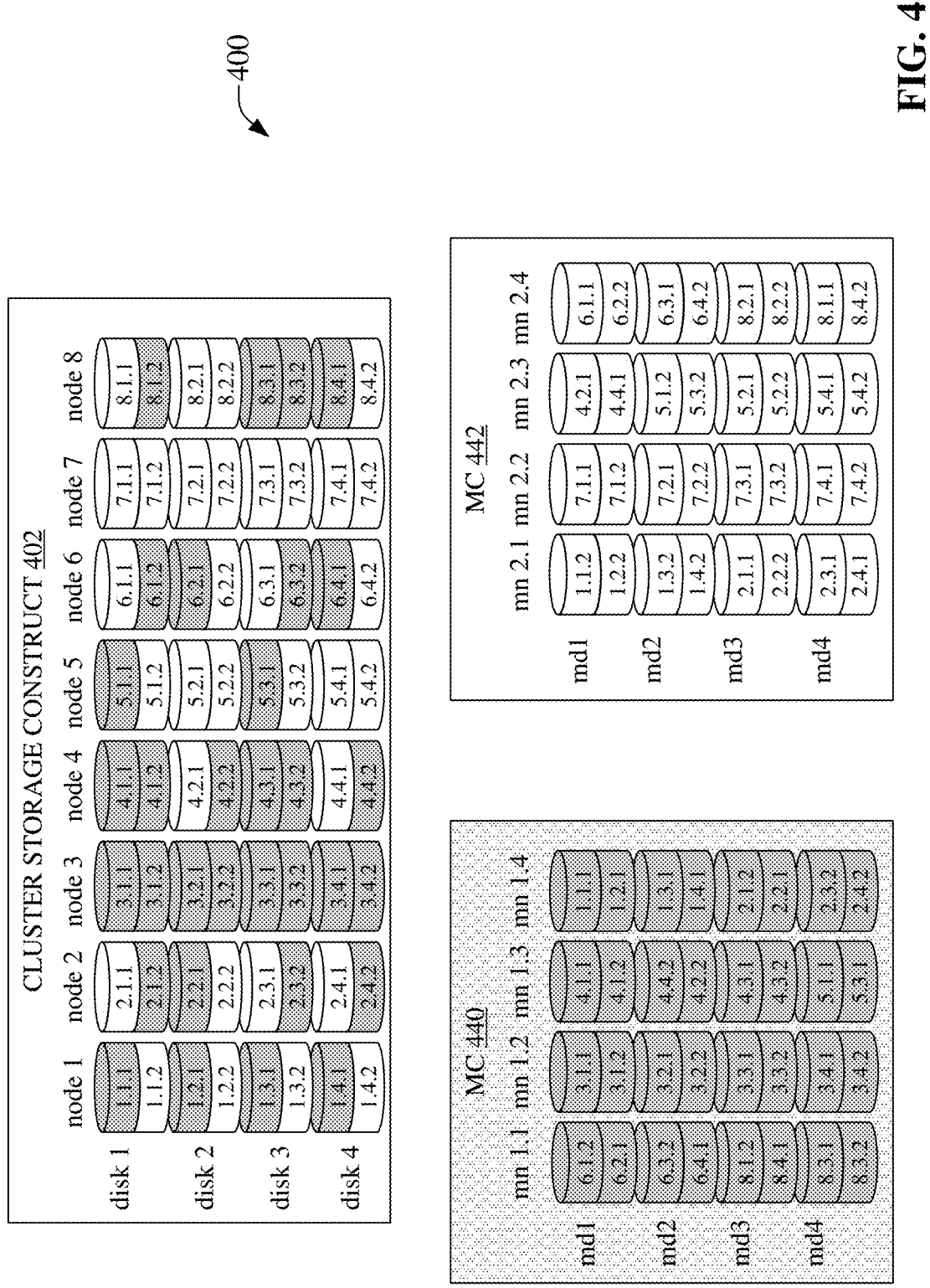
FIG. 4 is an illustration of an example system that can facilitate an example instantiation of at least one mapped node storage service at a real node of a doubly mapped RAIN storage system based on a corresponding mapping of mapped disks to extents of real disks, in accordance with aspects of the subject disclosure.

FIG. 4 is an illustration of example system 400 that can facilitate an example instantiation of at least one mapped node storage service at a real node of a doubly mapped RAIN storage system based on a corresponding mapping of mapped disks to extents of real disks, in accordance with aspects of the subject disclosure. System 400 can comprise cluster storage construct 402 that can comprise real disks, comprising real extents arrayed in real nodes, e.g., N real nodes by M real disks by L extents. Cluster storage construct 402 can support mapped clusters, e.g., MC 440, 442, etc. MC 440 can be a 4×4×2 mapped cluster whose mapped disks, for example, comprise extents that correspond to the greyed extents of disks of cluster storage construct 402, e.g., mapped disk 1.2.1 maps to real disk 6.3.2, etc. MC 442 can similarly be a 4×4×2 mapped cluster mapping to the white real disks of cluster storage construct 402, e.g., mapped disk 3.1.2 maps to real disk 4.4.1, etc. In this example, all cluster space is consumed to support MC 440 and 442, e.g., in this example no cluster storage space is unused, available, etc.

Figure 5:
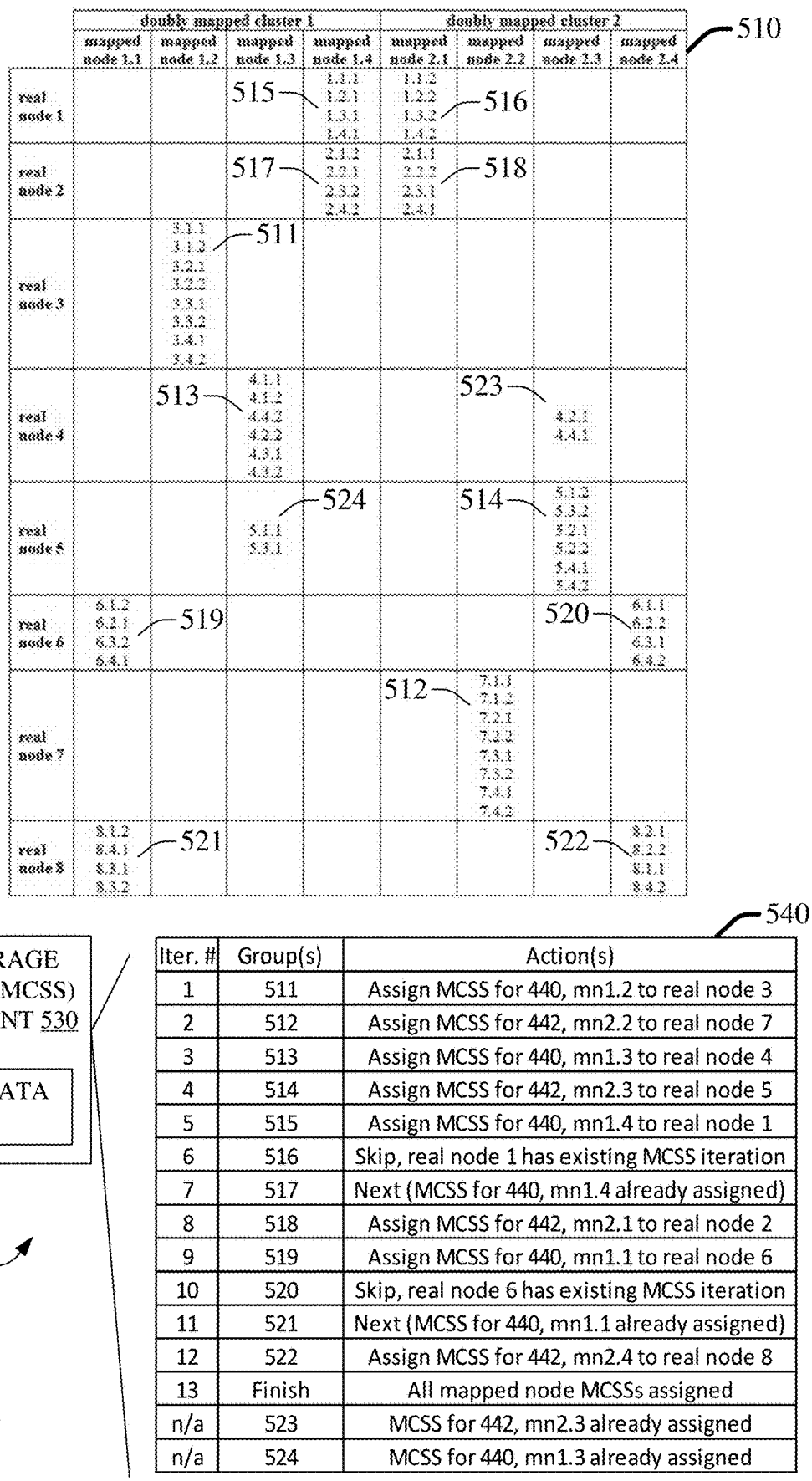
FIG. 5 is an illustration of an example system that can facilitate an example instantiation of a mapped node storage service(s) at a real node(s) of a doubly mapped RAIN storage system based on a count of extents of real disks supporting a mapped node, in accordance with aspects of the subject disclosure.

A mapping table, for example table 510 in FIG. 5, etc., can be determined for mapping of MC 440 and MC 442 onto real extents of real disks of cluster storage construct 402. The mapping table can, for example, indicate that real node 1 (read from the left hand column) contributes real extent 1.1.1 to mapped node 4, mapped disk 1 of MC 440; real extent 1.2.1 to mapped node 4, mapped disk 1 of MC 440; real extent 1.3.1 to mapped node 4, mapped disk 2 of MC 440; real extent 1.4.1 to mapped node 4, mapped disk 2 of MC 440; etc. The mapping table can provide an understanding of groups/counts of real extents, real disks, real nodes, real clusters, etc., contributing to the support of mapped nodes of mapped clusters. Analysis of the mapping table can facilitate instantiation of storage services, for example instantiating a storage service on a real node based on what real extents participate in a mapped clusters.

A storage service instance can enable interaction with data stored via a mapped disk of a mapped node. As an example, data stored via the mapped disks of mapped node 2 of MC 440, can be stored in real extents 3.1.1, 3.1.2, 3.21, 3.2.2, 3.3.1, 3.3.2, 3.4.1, and 3.4.2. Accordingly, in an embodiment, a data operation directed to a mapped node 2, mapped disk 1, mapped extent 2, can be performed at real extent 3.1.2. It can be appreciated that where mapped node 2 of MC 440 corresponds to data in real node 3, that it can be desirable to also assign a storage service to real node 3 to reduce consumption of computing resources otherwise consumed in inter-node data operations, e.g., where a storage service must perform operations on data stored in other real nodes, additional computing resources can be consumed and, as such, it can be desirable to keep an instance of a storage service more proximate tot the data it operates on. Accordingly, in FIG. 5, MCSS component 530 of system 500 can assign, at iteration #1 of actions table 540, an MCSS instance to real node 3 corresponding to an MCSS serving mn1.2, where mn1.2 (mapped node 1.2) can be the same as, or similar to mn1.2 of MC 440.

In an embodiment, selection of an instantiation of a storage service can be based on a count of the real disks participating in support of a mapped node. Referring again to illustrated example system 500, data stored via real node 7, e.g., real extents 7.1.1 to 7.4.2, can support mapped node 2.2 of MC 442 and, as such, in this example, a node 7 can instantiate a storage service instance to support mapped node 2.2 of MC 442. This can leave assignment of other instances of storage services related to other mapped nodes for other real nodes, or in some embodiments, as a second instance of a storage service on real node, though this aspect is not illustrated for clarity and brevity.

FIG. 5 is an illustration of example system 500 that can facilitate an example instantiation of a mapped node storage service(s) at a real node(s) of a doubly mapped RAIN storage system based on a count of extents of real disks supporting a mapped node, in accordance with aspects of the subject disclosure. System 500 can comprise mapping table 510 that can indicate groups of real extents, e.g., 511-524, according to their corresponding mapped nodes. A count of real extents for each group can be determined.

Actions table 540 can indicate actions related to instantiating storage services via computing resources of a real extent(s) of a real node(s) of a real cluster(s). Actions table 540 can be generated by MCSS component 530 based on MCSS data 532 and can indicate instances of storage services, for example, according to a count of real extents of disks contributing to a mapped node, for example, by traversing action table 540 from left to right then sorting by largest counts first. As an example, real node 3 can be assigned an instance of a storage service for group 511 based on it having the same or more extents than all other groups, e.g., eight extents, and appearing before group 512, e.g., above and to the left of group 512, and having a same count of extents as group 512. Accordingly, in this example, real node 7 can be assigned a next instance of a storage service based on the size and order of group 512, e.g., also eight extents but appearing below and to the right of group 511, followed by real node 4 based on the size and order of group 513, e.g., fewer extents than groups 511 and 512 but being the above/left of another group (514) having six extents, and more extents than 515-524. As indicated in action table 540, groups 511-522 can be associated with an instance of a storage service. It is noted that at iteration #8, assignment of a storage service based on group 518, e.g., assigning a storage service for mapped node 2.1 to real node 2 also therefor supports group 516 which is also part of mapped node 2.1. Similarly, at iteration #12, assignment of a storage service to real node 8 supporting group 522 at mapped node 2.4 also supports group 520 as part of mapped node 2.4. Similarly, groups 523 and 524 need not be iterated through because they are in mapped nodes that already have assigned storage services on real nodes. In some embodiments, other orders of traversing groups sorted by size are readily appreciated and are within the scope of the disclosed subject matter despite not being explicitly recited for the sake of clarity and brevity. In some embodiments, a real node can support multiple instances of storage services, for example, real node 1 can perform a first storage service instance for mapped node 1.4, e.g., groups 515 and 517, and a second storage service instance for mapped node 2.1, e.g., groups 516 and 518, rather than the illustrated real node 1 running a storage service instance for 515/517 and real node 2 running a storage service instance for 516/518. In an aspect, this can free real node 2 to run other storage services or to run no storage services.

Figure 6:
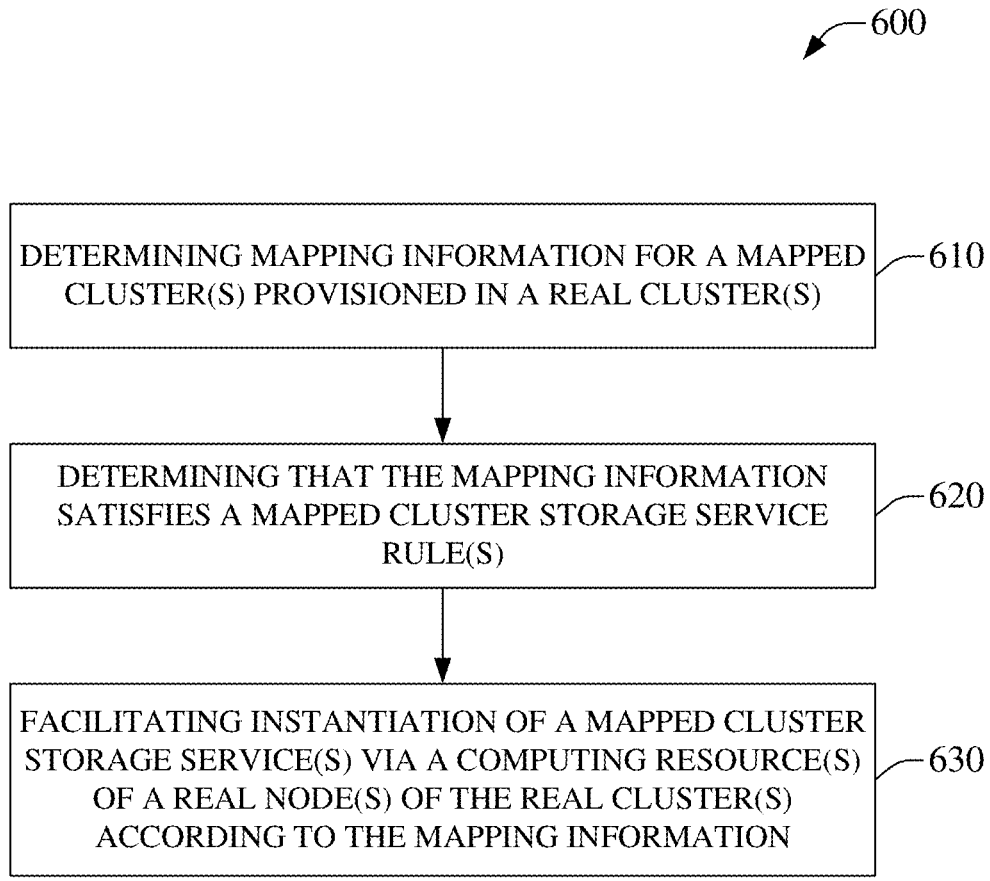
FIG. 6 is an illustration of an example method facilitating selective instantiation of a mapped node storage service at a real node of a doubly mapped RAIN storage system based on a mapping of mapped disks to real disks, in accordance with aspects of the subject disclosure.
Figure 7:
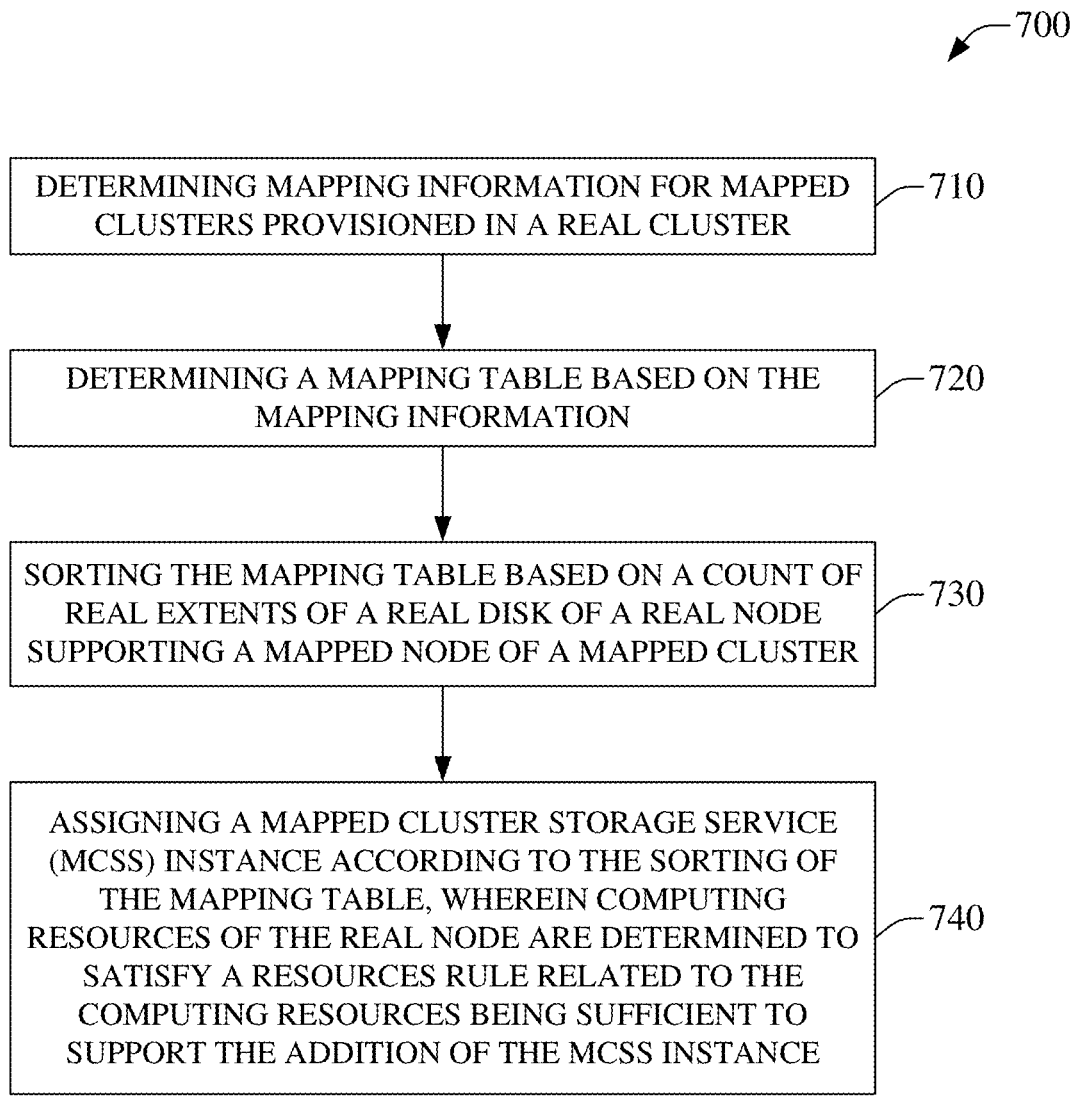
FIG. 7 is an illustration of an example method facilitating selective instantiation of a mapped node storage service at a real node of a doubly mapped RAIN storage system ordered by a count of extents of real disks supporting a mapped node, in accordance with aspects of the subject disclosure.
Figure 8:
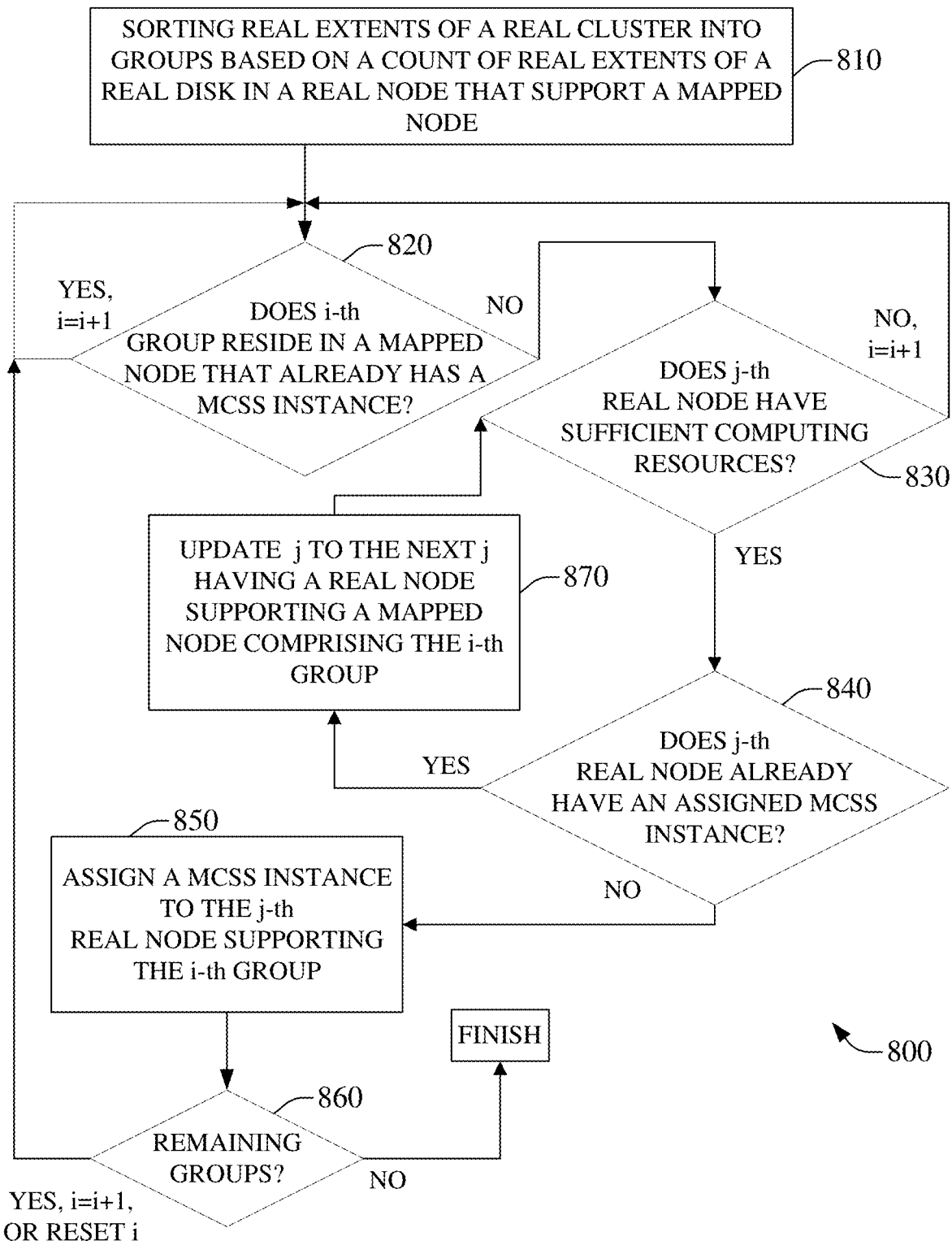
FIG. 8 illustrates an example method enabling selective instantiation of a mapped node storage service at a real node of a doubly mapped RAIN storage system, in accordance with aspects of the subject disclosure.

In view of the example system(s) described above, example method(s) that can be implemented in accordance with the disclosed subject matter can be better appreciated with reference to flowcharts in FIG. 6-FIG. 8. For purposes of simplicity of explanation, example methods disclosed herein are presented and described as a series of acts;

however, it is to be understood and appreciated that the claimed subject matter is not limited by the order of acts, as some acts may occur in different orders and/or concurrently with other acts from that shown and described herein. For example, one or more example methods disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a described example method in accordance with the subject specification. Further yet, two or more of the disclosed example methods can be implemented in combination with each other, to accomplish one or more aspects herein described. It should be further appreciated that the example methods disclosed throughout the subject specification are capable of being stored on an article of manufacture (e.g., a computer-readable medium) to allow transporting and transferring such methods to computers for execution, and thus implementation, by a processor or for storage in a memory.

FIG. 6 is an illustration of an example method 600 that can facilitate selective instantiation of a mapped node storage service at a real node of a doubly mapped RAIN storage system based on a mapping of mapped disks to real disks, in accordance with aspects of the subject disclosure. Method 600, at 610, can comprise determining mapping information for a mapped cluster provisioned in a real cluster. A group of mapped nodes can appear to be a contiguous block of data storage even where, for example, it can be spread across multiple extents of one or more real disks, multiple real groups of hardware nodes, multiple real clusters of hardware nodes, multiple geographic locations, etc. Mapping information can reflect which real disks support mapped nodes of a mapped cluster.

Method 600, at 620, can comprise determining that the mapping information satisfies a mapped cluster storage rule. An example of a first mapped cluster storage rule can be that a first threshold level of real extents of real disks supporting a mapped node of a mapped cluster exist on a real node. Accordingly, a second mapped cluster storage rule can be that a second threshold level of real extents of real disks supporting a mapped node of a mapped cluster exist on a real node. Thus, at 630, method 600 can comprise facilitating instantiation of a MCSS via a computing resource of a real node of the real cluster according to the mapping information. As such, by layering the example mapped cluster storage rules, real nodes having the first, second, etc., threshold number of real disks contributing to a mapped node can be allocated MCSS instances in a manner that results in a MCSS instance being closer to larger groups of real extents for a given mapped node than to smaller groups of real extents for the given mapped node. At this point method 600 can end.

FIG. 7 is an illustration of an example method 700, facilitating selective instantiation of a mapped node storage service at a real node ordered by a count of real extents supporting a mapped node, in accordance with aspects of the subject disclosure. At 710, method 700 can comprise determining mapping information for mapped clusters provisioned in a real cluster. As previously discussed, a group of mapped nodes can appear to be a contiguous block of data storage even where, for example, it can be spread across multiple extents of one or more real disks, multiple real groups of hardware nodes, multiple real clusters of hardware nodes, multiple geographic locations, etc. Mapping information can reflect which real disks support mapped nodes of a mapped cluster.

At 720, method 700 can comprise determining a mapping table based on the mapping information. A mapping table can be, for example, depicted as shown in FIG. 5, etc., e.g., mapping table 510, etc. A mapping table can indicate real extents of a real disk of a real node of a real cluster supporting a mapped node of a mapped cluster. At 730, the mapping table can be sorted based on a count of the real disks of a real node supporting a mapped node of a mapped cluster. In an embodiment, the sorting can indicate real nodes contributing more real extents for a mapped node before real nodes contributing fewer real extents for a mapped node. As an example, real node 3 can be indicated before real node 1 from mapping table 510 because real node 3 comprises a group, e.g., 511, having eight real extents supporting one mapped node, e.g., mapped node 1.3, while real node 1 supports two groups of four extents, e.g., 515 and 516, for two corresponding mapped nodes, e.g., mapped nodes 1.4 and 2.1. In an embodiment, example real node 3 can be indicated before real node 7 from mapping table 510 because while both real node 3 and real node 7 support groups of eight extents, e.g., 511 and 512, real node 3 appears in mapping table 510 'earlier' than real node 7 when following, for example, a left to right then down traversal of mapping table 510.

At 740, method 700 can comprise assigning a MCSS instance according to the sorting of the mapping table. At this point method 700 can end. In an aspect, this can result in first assigning MCSS instances to larger groups of real extents supporting a mapped node, before assigning MCSS instances to smaller groups. Accordingly, MCSS instances can be assigned in manner that results in an MCSS instance being assigned to a real node that is closer to the larger groups of extents, which can reduce a burden on computing resources of the real nodes of the real cluster in comparison to another assignment scheme that can result in some large groups of extents being located further from an associated MCSS instance, e.g., it can be favorable to control, via an MCSS instance, more real extents supporting a mapped cluster by running the MCSS instance on the node contributing more of the real extents than to run the MCSS instance on a real node having fewer real extents supporting the same mapped node.

In an aspect, at 740, the assignment can be constrained by also determining that the computing resource(s) of the proposed real node satisfy a resources rule. The resources rule can be related to determining that the available computing resources of a real node proposed for instantiation of an MCSS instance are sufficient to support the addition of the MCSS instance. As an example, if a real node is already heavily burdened, it can be undesirable to add further burden by assigning an MCSS instance to that real node, in which case, other real nodes can be moved higher in a ranking, ordering, sorting, etc., assignment can be delayed to see if another real node will be selected by the MCSS assigning algorithm, etc. As an example, in mapping table 510, real node 1, at iteration #5, can instantiate a MCSS for mapped node 1.4, as such, when group 516 is addressed in iteration #6, the algorithm can skip assignment of a MCSS because real node 1 is already running an instance of an MCSS. Accordingly, when group 518 is addressed at iteration #8, another instance of an MCSS can be assigned to real node 2, this instance can support mapped node 2.1 that includes group 516. It is noted that where a group is skipped, and where that group is not subsequently supported by another MCSS instance, the skipped group can be addressed again in a later iteration of the MCSS assigning algorithm, though this is not illustrated in the example shown in FIG. 5 for clarity and brevity.

In an aspect, the resources rule can evaluate individual real nodes as well as the operation of the real cluster itself, e.g., the resources rule can be satisfied when despite further burdening a first real node, the whole real cluster performs better than other assignment options. As an example, where adding a new instance of an MCSS as second instance of an MCSS to a first real node already assigned a first instance of an MCSS is determined to result in a first expected real cluster performance and where adding the new instance of the MCSS as a first instance to a second real node is determined to result in a second expected real cluster performance, where the first expected performance is favorable to the second expected performance, the new instance can be assigned as a second instance at the first node despite it further burdening the first node computing resources more heavily than it would have if assigned to the second real node. However, in this example, where the first real node would be unable to concurrently run the first and second instance, for example due to a lack of computing resources, etc., then the new instance can be assigned as a first instance to the second real node despite the overall performance of the real cluster being expected to be less favorable.

FIG. 8 is an illustration of an example method 800, which can enable selective instantiation of a mapped node storage service at a real node, in accordance with aspects of the subject disclosure. At 810, method 800 can comprise sorting real extents of real disks of real clusters into groups based on a count of real extents of a real disk of a real node that supports a mapped node(s). Generally the groups can be ordered from largest to smallest group, e.g., a group of four real extents that support one mapped node can be ranked higher than a group of three real extents that support another mapped node, etc.

At 820, method 800 can comprise determining if an i-th group of the groups of real extents that support a mapped node already has a MCSS instance associated with it. A mapped node can map to real extents of real disks from more than one real node, as such, an i-th group of real extents can be said to reside in a mapped node where the group of real extents correspond to the mapped node. As an example, mapped node 1.1 of MC 440 in FIG. 4 corresponds to real extents 6.1.2, 6.2.1, 6.3.2, 6.4.1, 8.1.2, 8.4.1, 8.3.1, and 8.3.2, which real extents can be said to be in mapped node 1.1 of MC 440. Accordingly, real node 6 can have a four extents, and real node 8 can have four extents, said to reside in mapped cluster 1.1 of MC 440, e.g., both real disks contribute extents to enabling mapped node 1.1 of MC 440. If the i-th group does reside in a mapped node that already has a MCSS instance associated with it, then the next group can be analyzed because the mapped node can already be subject to control via an existing storage service instance. Where the i-th group does not reside in a mapped node that already has a MCSS instance associated with it, then method 800 can proceed to 830.

At 830, method 800 can comprise determining if a j-th real node has sufficient computing resources to facilitate running an instance of a MCSS. The j-th real node can be a real node comprising the group of real extents. The sufficiency of the computing resources for the real node can be analyzed to determine if executing an instance of a MCSS will have negative effects on the real node itself or on the real cluster comprising the real node. If the real node is determined to be insufficient to perform the instance of the MCSS, then assigning the group can be skipped and a next group can be analyzed, e.g., the group can be moved to a later point in the queue of groups. Where the real node/cluster are sufficiently unburdened, the real node can be a candidate for instantiation of the MCSS instance and method 800 can move to 840. It can be determined, at 840, if the j-th real node already has an assigned MCSS instance, e.g., if the real node comprising the real disks of the group of extents is already running a MCSS instance for another mapped node. If the j-th real node is already running an assigned MCSS instance, then at 870, method 800 can comprise updating the j-th real node to a next real node having a real disk contributing to the support of a mapped node comprising the i-th group of extents. As an example, from FIG. 5, if the i-th group is 516, e.g., real node 1 is the j-th real node, and the i-th group supports mapped node 2.1 of MC 442, then the next j-th real node can be real node 2 because the group 518 also contribute to the support of mapped node 2.1 of MC 442. In this example, it is noted that group 517 is addressed before group 518, but because group 517 is already supported by the MCSS running on real node 1, see iteration #5 for group 515 supporting mapped node 1.4 of MC 440, therefore no additional MCSS needs to be assigned for group 517, e.g., at 820, group 517 would answer 'yes' and I would be incremented to group 518.

Method 800 moves to 850 where the j-th real node does not already have an assigned MCSS instance and, as such, the i-th group and j-th real node both do not correspond to an existing MCSS instance and the j-th real node has sufficient computing resources to perform the instance of the MCSS. As such, at 850, method 800 can assign a MCSS instance to the j-th real node comprising the i-th group of extents supporting the mapped node. At this point, method 800, at 860, can determine if there are remaining groups. Where there are no remaining groups, e.g., all groups of real disks have been are controlled by an instance of a MCSS, then method 800 can end.

Where there are remaining groups, then the i-th group can be incremented to the next group. Where the last i-th group has been reach, but some groups have been skipped at 820 or 830, then the i-th group can be reset to the first group so that method 800 can continue and process the skipped groups. It will be noted that method 800 can fail if, after iterating, a group cannot eventually be assigned to an instance of a MCSS.

Method 800, for example, can be set in the context of FIG. 5, wherein at 810 groups of eight, six, four, and two extents can be determined. At 820, group 511 having eight extents can be determined not to reside in a mapped node which already has an MCSS instance. Then at 830, the j-th real node, e.g., real node 3, can be determined to have sufficient computing resources and, at 840, can be determined to not already have an assigned MCSS instance, such that, at 850, an MCSS instance can be assigned to real node 3 to support mapped node 1.2 of MC 440, which is in agreement with iteration number one of actions table 540. At this point, many other groups remain and, at 860, the next group, e.g., group 512, can be analyzed during a next iteration entering at 820 of method 800. The next iteration proceeds similarly and results in assigning an MCSS instance to real node 7, in accord with iteration number 2 of actions table 540. Similarly, iterations 3-5 proceed as illustrated.

At the next iteration, e.g., iteration #6, the group 516 can be determined, at 840, to be in a real node that already has an assigned MCSS instance, e.g., j=real node 1 that already has at least one instance of a MCSS assigned to it, namely at iteration #5. At 870, method 800 can update j to j=real node 2, because mapped node 2.1 of MC 442 is supported by extents from two real nodes, e.g., real nodes 1 and 2, therefore real node 2 is the next j-th real node. Returning to 840 via 830, real node 2 can be determined to not yet be assigned a MCSS instance, and an assignment can be performed at 850. In the next iteration of method 800 the group 517 is determined to already be supported by an assigned MCSS at real node 1, and i can be incremented to group 518. Group 518, at 820, can be determined to not reside in a mapped node having a MCSS instance, and method 800 can proceed to assign to the j-th real node, e.g., real node 2, of note this also then supports the extents of group 516 which also reside in mapped node 2.1 of MC 442. Method 800 can continue to iterate until all groups are associated with an MCSS instance.

Figure 9:
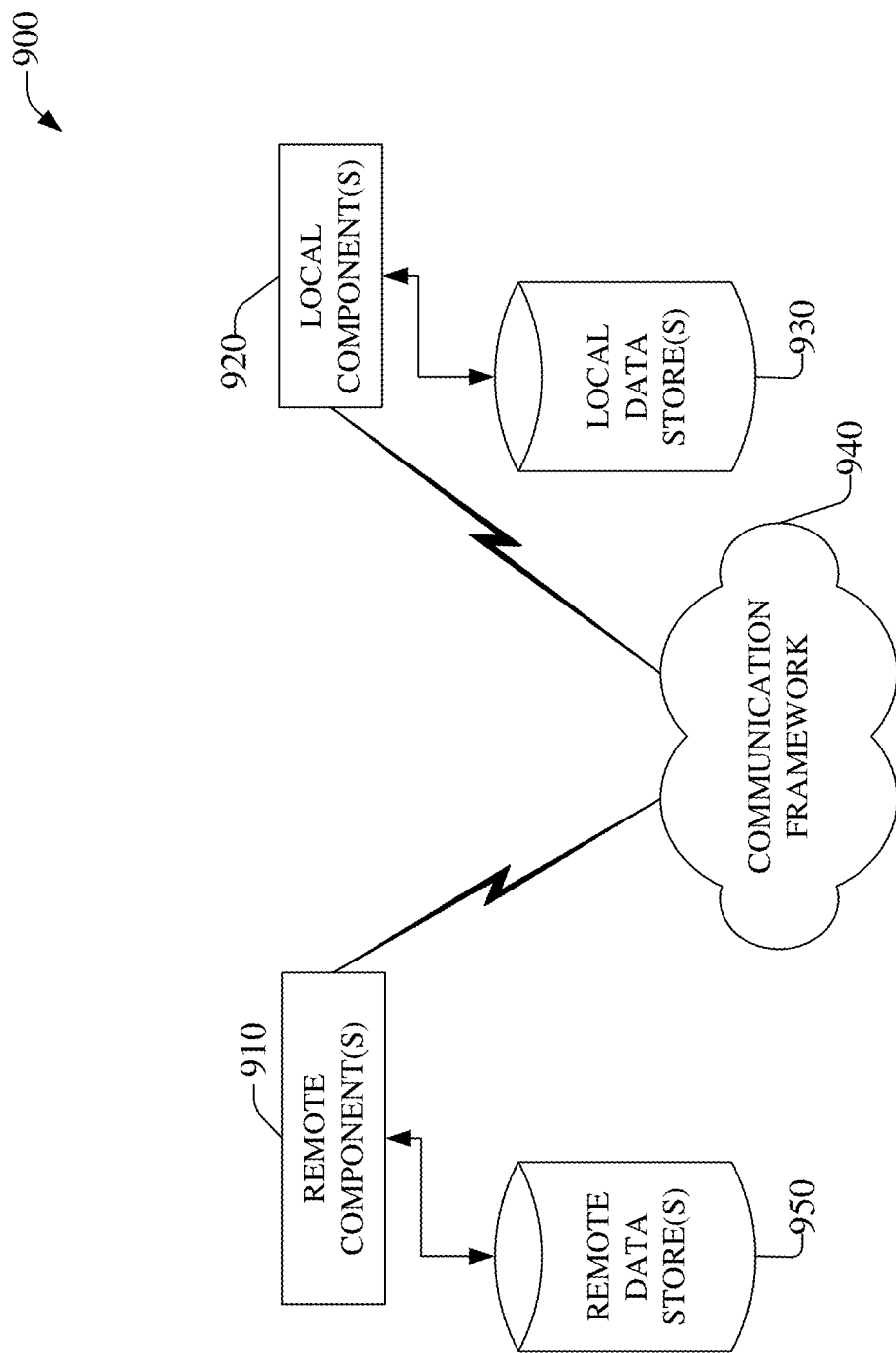
FIG. 9 depicts an example schematic block diagram of a computing environment with which the disclosed subject matter can interact.

FIG. 9 is a schematic block diagram of a computing environment 900 with which the disclosed subject matter can interact. The system 900 comprises one or more remote component(s) 910. The remote component(s) 910 can be hardware and/or software (e.g., threads, processes, computing devices). In some embodiments, remote component(s) 910 can be real nodes of a real cluster in communication with other real nodes of the real cluster that can be located in a different physical location. Communication framework 940 can comprise wired network devices, wireless network devices, mobile devices, wearable devices, radio access network devices, gateway devices, femtocell devices, servers, etc. In an aspect, a real cluster can be comprised of physically disparate devices, e.g., a real cluster can comprise devices in entirely different data centers, different cities, different states, different countries, etc. As an example, nodes 1-4 of cluster storage construct 202 can be located in Seattle Wash., while nodes 5-6 can be located in Boston Mass., and nodes 7-N can be located in Moscow Russia.

The system 900 also comprises one or more local component(s) 920. The local component(s) 920 can be hardware and/or software (e.g., threads, processes, computing devices). In some embodiments, local component(s) 920 can be real nodes of a real cluster in communication with other real nodes of the real cluster that can be located in a different physical location.

One possible communication between a remote component(s) 910 and a local component(s) 920 can be in the form of a data packet adapted to be transmitted between two or more computer processes. Another possible communication between a remote component(s) 910 and a local component(s) 920 can be in the form of circuit-switched data adapted to be transmitted between two or more computer processes in radio time slots. The system 900 comprises a communication framework 940 that can be employed to facilitate communications between the remote component(s) 910 and the local component(s) 920, and can comprise an air interface, e.g., Uu interface of a UMTS network, via a long-term evolution (LTE) network, etc. Remote component(s) 910 can be operably connected to one or more remote data store(s) 950, such as a hard drive, solid state drive, SIM card, device memory, etc., that can be employed to store information on the remote component(s) 910 side of communication framework 940. Similarly, local component(s) 920 can be operably connected to one or more local data store(s) 930, that can be employed to store information on the local component(s) 920 side of communication framework 940. As an example, remote and local real nodes can communicate key performance indicators (KPIs), move stored data between local and remote real nodes, such as when selectively instantiating a mapped cluster storage service instance, etc.

In order to provide a context for the various aspects of the disclosed subject matter, FIG. 10, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that performs particular tasks and/or implement particular abstract data types.

In the subject specification, terms such as "store," "storage," "data store," "data storage," "database," and substantially any other information storage component relevant to operation and functionality of a component, refer to "memory components," or entities embodied in a "memory" or components comprising the memory. It is noted that the memory components described herein can be either volatile memory or nonvolatile memory, or can comprise both volatile and nonvolatile memory, by way of illustration, and not limitation, volatile memory 1020 (see below), nonvolatile memory 1022 (see below), disk storage 1024 (see below), and memory storage 1046 (see below). Further, nonvolatile memory can be included in read only memory, programmable read only memory, electrically programmable read only memory, electrically erasable read only memory, or flash memory. Volatile memory can comprise random access memory, which acts as external cache memory. By way of illustration and not limitation, random access memory is available in many forms such as synchronous random access memory , dynamic random access memory, synchronous dynamic random access memory, double data rate synchronous dynamic random access memory, enhanced synchronous dynamic random access memory, SynchLink dynamic random access memory, and direct Rambus random access memory. Additionally, the disclosed memory components of systems or methods herein are intended to comprise, without being limited to comprising, these and any other suitable types of memory.

Moreover, it is noted that the disclosed subject matter can be practiced with other computer system configurations, comprising single-processor or multiprocessor computer systems, mini-computing devices, mainframe computers, as well as personal computers, hand-held computing devices (e.g., personal digital assistant, phone, watch, tablet computers, netbook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

FIG. 10 illustrates a block diagram of a computing system 1000 operable to execute the disclosed systems and methods in accordance with an embodiment. Computer 1012, which can be, for example, comprised in a cluster storage construct 102, 202, 302, 402, etc., e.g., in the nodes thereof, comprise in mapped cluster control component 220, etc., MC storage service component 224, etc., or comprised in other components disclosed herein, can comprise a processing unit 1014, a system memory 1016, and a system bus 1018. System bus

1018 couples system components comprising, but not limited to, system memory 1016 to processing unit 1014. Processing unit 1014 can be any of various available processors. Dual microprocessors and other multiprocessor architectures also can be employed as processing unit 1014.

System bus 1018 can be any of several types of bus structure(s) comprising a memory bus or a memory controller, a peripheral bus or an external bus, and/or a local bus using any variety of available bus architectures comprising, but not limited to, industrial standard architecture, microchannel architecture, extended industrial standard architecture, intelligent drive electronics, video electronics standards association local bus, peripheral component interconnect, card bus, universal serial bus, advanced graphics port, personal computer memory card international association bus, Firewire (Institute of Electrical and Electronics Engineers 1194), and small computer systems interface.

System memory 1016 can comprise volatile memory 1020 and nonvolatile memory 1022. A basic input/output system, containing routines to transfer information between elements within computer 1012, such as during start-up, can be stored in nonvolatile memory 1022. By way of illustration, and not limitation, nonvolatile memory 1022 can comprise read only memory, programmable read only memory, electrically programmable read only memory, electrically erasable read only memory, or flash memory. Volatile memory 1020 comprises read only memory, which acts as external cache memory. By way of illustration and not limitation, read only memory is available in many forms such as synchronous random access memory, dynamic read only memory, synchronous dynamic read only memory, double data rate synchronous dynamic read only memory, enhanced synchronous dynamic read only memory, SynchLink dynamic read only memory, Rambus direct read only memory, direct Rambus dynamic read only memory, and Rambus dynamic read only memory.

Computer 1012 can also comprise removable/non-removable, volatile/non-volatile computer storage media. FIG. 10 illustrates, for example, disk storage 1024. Disk storage 1024 comprises, but is not limited to, devices like a magnetic disk drive, floppy disk drive, tape drive, flash memory card, or memory stick. In addition, disk storage 1024 can comprise storage media separately or in combination with other storage media comprising, but not limited to, an optical disk drive such as a compact disk read only memory device, compact disk recordable drive, compact disk rewritable drive or a digital versatile disk read only memory. To facilitate connection of the disk storage devices 1024 to system bus 1018, a removable or non-removable interface is typically used, such as interface 1026.

Computing devices typically comprise a variety of media, which can comprise computer-readable storage media or communications media, which two terms are used herein differently from one another as follows.

Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can comprise, but are not limited to, read only memory, programmable read only memory, electrically programmable read only memory, electrically erasable read only memory, flash memory or other memory technology, compact disk read only memory, digital versatile disk or other optical disk storage, magnetic cassettes, magnetic tape, magnetic disk storage or other magnetic storage devices, or other tangible media which can be used to store desired information. In this regard, the term "tangible" herein as may be applied to storage, memory or computer-readable media, is to be understood to exclude only propagating intangible signals per se as a modifier and does not relinquish coverage of all standard storage, memory or computer-readable media that are not only propagating intangible signals per se. In an aspect, tangible media can comprise non-transitory media wherein the term "non-transitory" herein as may be applied to storage, memory or computer-readable media, is to be understood to exclude only propagating transitory signals per se as a modifier and does not relinquish coverage of all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium. As such, for example, a computer-readable medium can comprise executable instructions stored thereon that, in response to execution, can cause a system comprising a processor to perform operations, comprising selecting first real extents of a real node of a real cluster based on how many real extents are used to support a mapped node, wherein the first real extents map to at least a portion of the mapped node, and further comprising, causing a first instance of a mapped cluster storage service to run on computing resources of the first real node based on the first real extents, as is disclosed herein.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

It can be noted that FIG. 10 describes software that acts as an intermediary between users and computer resources described in suitable operating environment 1000. Such software comprises an operating system 1028. Operating system 1028, which can be stored on disk storage 1024, acts to control and allocate resources of computer system 1012. System applications 1030 take advantage of the management of resources by operating system 1028 through program modules 1032 and program data 1034 stored either in system memory 1016 or on disk storage 1024. It is to be noted that the disclosed subject matter can be implemented with various operating systems or combinations of operating systems.

A user can enter commands or information into computer 1012 through input device(s) 1036. In some embodiments, a user interface can allow entry of user preference information, etc., and can be embodied in a touch sensitive display panel, a mouse/pointer input to a graphical user interface (GUI), a command line controlled interface, etc., allowing a user to interact with computer 1012. Input devices 1036 comprise, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1014 through system bus 1018 by way of interface port(s) 1038. Interface port(s) 1038 comprise, for example, a serial port, a parallel port, a game port, a universal serial bus, an infrared port, a Bluetooth port, an IP port, or a logical port associated with a wireless service, etc. Output device(s) 1040 use some of the same type of ports as input device(s) 1036.

Thus, for example, a universal serial busport can be used to provide input to computer 1012 and to output information from computer 1012 to an output device 1040. Output adapter 1042 is provided to illustrate that there are some output devices 1040 like monitors, speakers, and printers, among other output devices 1040, which use special adapters. Output adapters 1042 comprise, by way of illustration and not limitation, video and sound cards that provide means of connection between output device 1040 and system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. Remote computer(s) 1044 can be a personal computer, a server, a router, a network PC, cloud storage, a cloud service, code executing in a cloud-computing environment, a workstation, a microprocessor-based appliance, a peer device, or other common network node and the like, and typically comprises many or all of the elements described relative to computer 1012. A cloud computing environment, the cloud, or other similar terms can refer to computing that can share processing resources and data to one or more computer and/or other device(s) on an as needed basis to enable access to a shared pool of configurable computing resources that can be provisioned and released readily. Cloud computing and storage solutions can store and/or process data in third-party data centers which can leverage an economy of scale and can view accessing computing resources via a cloud service in a manner similar to a subscribing to an electric utility to access electrical energy, a telephone utility to access telephonic services, etc.

For purposes of brevity, only a memory storage device 1046 is illustrated with remote computer(s) 1044. Remote computer(s) 1044 is logically connected to computer 1012 through a network interface 1048 and then physically connected by way of communication connection 1050. Network interface 1048 encompasses wire and/or wireless communication networks such as local area networks and wide area networks. Local area network technologies comprise fiber distributed data interface, copper distributed data interface, Ethernet, Token Ring and the like. Wide area network technologies comprise, but are not limited to, point-to-point links, circuit-switching networks like integrated services digital networks and variations thereon, packet switching networks, and digital subscriber lines. As noted below, wireless technologies may be used in addition to or in place of the foregoing.

Communication connection(s) 1050 refer(s) to hardware/ software employed to connect network interface 1048 to bus 1018. While communication connection 1050 is shown for illustrative clarity inside computer 1012, it can also be external to computer 1012. The hardware/software for connection to network interface 1048 can comprise, for example, internal and external technologies such as modems, comprising regular telephone grade modems, cable modems and digital subscriber line modems, integrated services digital network adapters, and Ethernet cards.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. Moreover, the use of any particular embodiment or example in the present disclosure should not be treated as exclusive of any other particular embodiment or example, unless expressly indicated as such, e.g., a first embodiment that has aspect A and a second embodiment that has aspect B does not preclude a third embodiment that has aspect A and aspect B. The use of granular examples and embodiments is intended to simplify understanding of certain features, aspects, etc., of the disclosed subject matter and is not intended to limit the disclosure to said granular instances of the disclosed subject matter or to illustrate that combinations of embodiments of the disclosed subject matter were not contemplated at the time of actual or constructive reduction to practice.

Further, the term "include" is intended to be employed as an open or inclusive term, rather than a closed or exclusive term. The term "include" can be substituted with the term "comprising" and is to be treated with similar scope, unless otherwise explicitly used otherwise. As an example, "a basket of fruit including an apple" is to be treated with the same breadth of scope as, "a basket of fruit comprising an apple."

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities, machine learning components, or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks comprise broadcast technologies (e.g., sub-Hertz, extremely low frequency, very low frequency, low frequency, medium frequency, high frequency, very high frequency, ultra-high frequency, super-high frequency, extremely high frequency, terahertz broadcasts, etc.); Ethernet; X.25; powerline-type networking, e.g., Powerline audio video Ethernet, etc.; femtocell technology; Wi-Fi; worldwide interoperability for microwave access; enhanced general packet radio service; second generation partnership project (2G or 2GPP); third generation partnership project (3G or 3GPP); fourth generation partnership project (4G or 4GPP); long term evolution (LTE); fifth generation partnership project (5G or 5GPP); third generation partnership project universal mobile telecommunications system; third generation partnership project 2; ultra mobile broadband; high speed packet access; high speed downlink packet access; high speed uplink packet access; enhanced data rates for global system for mobile communication evolution radio access network; universal mobile telecommunications system terrestrial radio access network; or long term evolution advanced. As an example, a millimeter wave broadcast technology can employ electromagnetic waves in the frequency spectrum from about 30 GHz to about 300 GHz. These millimeter waves can be generally situated between microwaves (from about 1 GHz to about 30 GHz) and infrared (IR) waves, and are sometimes referred to extremely high frequency (EHF). The wavelength (X) for millimeter waves is typically in the 1-mm to 10-mm range.

The term "infer" or "inference" can generally refer to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference, for example, can be employed to identify a specific context or action, or can generate a probability distribution over states of interest based on a consideration of data and events. Inference can also refer to techniques employed for composing higher-level events from a set of events and/or data. Such inference results in the construction of new events or actions from a set of observed events and/or stored event data, whether the events, in some instances, can be correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

What has been described above includes examples of systems and methods illustrative of the disclosed subject matter. It is, of course, not possible to describe every combination of components or methods herein. One of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A system, comprising:
   a processor; and
   a memory that stores executable instructions that, when executed by the processor, facilitate performance of operations, comprising:
   receiving mapping data indicating an allocation of real storage device extents comprised in real nodes comprised in a real storage cluster, wherein the allocation of the real storage device extents supports a logical representation of mapped storage devices comprised in a first mapped node of a mapped storage cluster, wherein the logical representation of the mapped storage cluster comports with a data loss protection rule that prohibits the mapped storage cluster from storing first data at a first real storage device extent of a first real node of the real cluster and storing second data redundant to the first data at a second real storage device extent of the real node to avoids multiple mapped nodes of the mapped storage cluster failing in response to the real node failing; and assigning execution of a first instance of a mapped cluster storage service to a first real node of the real nodes based on a first count of a first portion of the real storage device extents, wherein the first portion of the real storage devices facilitates data interactions via the first mapped node of the mapped storage cluster.

2. The system of claim 1, wherein the assigning the execution of the first instance of the mapped cluster storage service is further based on determining that a sufficiency rule is satisfied by first computing resources of the first real node, and wherein the sufficiency rule relates to computing resources being sufficient to execute the first instance of the mapped cluster storage service above a threshold performance level.

3. The system of claim 2, wherein the operations further comprise, in response to determining that the sufficiency rule is not satisfied by the first computing resources of the first real node, substituting a second portion of the real storage device extents for the first portion, and wherein the second portion of the real storage devices facilitates data interaction via a second mapped node of the mapped storage cluster.

4. The system of claim 3, wherein the second portion of the real storage device extents is selected based on a second count of a second portion of the real storage devices.

5. The system of claim 3, wherein the second mapped node is a same mapped node as the first mapped node.

6. The system of claim 1, wherein the assigning the execution of the first instance of the mapped cluster storage service is further based on determining that execution of a second instance of the mapped cluster storage service is not assigned to a second real node of the real nodes to facilitate data interactions via the first mapped node.

7. The system of claim 6, wherein the operations further comprise, in response to determining that the second instance of the mapped cluster storage service is assigned to execute via the second real node, substituting a second portion of the real storage device extents for the first portion of the real storage device extents.

8. The system of claim 1, wherein the assigning the execution of the first instance of the mapped cluster storage service is further based on determining that the first real node has not been assigned execution of a second mapped cluster storage service to facilitate data interactions via a second mapped node of the mapped nodes.

9. The system of claim 8, wherein the operations further comprise, in response to determining that the first real node has been assigned execution of a second mapped cluster storage service, substituting a third real node of the real nodes for the first real node.

10. The system of claim 9, wherein the third real node comprises a second portion of the real storage devices that facilitate data interactions via the first mapped node of the mapped nodes.

11. The system of claim 1, wherein the assigning the execution of the first instance of the mapped cluster storage service is based on the first count of the first portion of the real storage device extents is further based on the first count being a higher count than a second count of a second portion of the real storage device extents, and wherein the second portion of the real storage device extents facilitates data interactions via a second mapped node of the mapped nodes.

12. The system of claim 1, wherein each real node of the real storage cluster is assigned execution of one instance of the mapped cluster storage service.

13. The system of claim 1, wherein at least one real node of the real storage cluster is assigned execution of at least two instances of the mapped cluster storage service.

14. The system of claim 1, wherein the first count of the first portion of the real storage device extents is determined from the mapping data, wherein the first count indicates a number of real storage device extents in the first portion of the real storage device extents, wherein the first portion of the real storage device extents is comprised in one real node of the real nodes, and wherein the first portion of real storage device extents correlate to at least a second portion of the first mapped node.

15. A method, comprising:
determining, by a system comprising a processor and a memory, a first number of first real disk extents of a real cluster, wherein the first real disk extents map to at least a portion of a first mapped node of a first mapped cluster, and wherein the first mapped cluster comports with a data loss protection rule that prohibits the first mapped cluster from storing first data at a at a first extent of a real node of the real cluster and storing second data redundant to the first data at a second extent of the real node to decrease a likelihood of failures of multiple mapped nodes of the mapped storage cluster as a result of a failure of the real node;

ranking, by the system, the first real disk extents among other real disk extents of the real cluster, wherein the ranking is based on the first number of the first real disk extents; and instantiating, by the system, a first instance of a mapped cluster storage service at a first real node of the real cluster based on the first instance of the mapped cluster storage service being determined to satisfy an instantiation rule, wherein the instantiation rule is related to the ranking of the first real disk extents.

16. The method of claim 15, wherein the instantiating the first instance of the mapped cluster storage service is based on the instantiation rule further being related to the first real node being determined to comprise at least a threshold amount of computer resources to execute the first instance of a mapped cluster storage service.

17. The method of claim 15, wherein the instantiating the first instance of the mapped cluster storage service is based on the instantiation rule further being related to determining that the first mapped cluster is not already associated with a second instance of the mapped cluster storage service.

18. The method of claim 15, wherein the instantiating the first instance of the mapped cluster storage service is based on the instantiation rule further being related to determining that the first real node is not already instantiating a second instance of the mapped cluster storage service in support of a second mapped node of a second mapped cluster.

19. A computer-readable storage medium, comprising executable instructions that, when executed by a processor, facilitate performance of operations, comprising:
selecting real disk extents of a real disk of a real node of a real cluster based on how many overall real disk extents comprise the real disk extents, wherein the real disk extents map to at least a portion of a mapped node of a mapped cluster; and causing a first instance of a mapped cluster storage service to execute using computing resources of the real node based on the real disk extents, wherein the first instance of the mapped cluster is in accord with a data loss prevention rule that avoids storing first data to a first extent of a real node of the real cluster and storing second data, which is redundant to the first data, at a second extent of the same real node to prevent failures of multiple mapped nodes of the mapped storage cluster as a result of a failure of the real node.

20. The computer-readable storage medium of claim 19, wherein the causing the first instance of the mapped cluster storage service to execute using the computing resources of the real node is further based on determining that the computing resources of the real node are not executing a second instance of the mapped cluster storage service, that the real node is not associated with a third instance of the mapped cluster storage service, and that the computing resources of the real node are at least at a threshold level of performance.

\* \* \* \* \*